(12) United States Patent
Masuda et al.

(10) Patent No.: US 10,601,315 B2
(45) Date of Patent: Mar. 24, 2020

(54) DC-DC CONVERTER

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

(72) Inventors: Kazuki Masuda, Mie (JP); Tou Chin, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 16/343,877

(22) PCT Filed: Oct. 24, 2017

(86) PCT No.: PCT/JP2017/038313
§ 371 (c)(1),
(2) Date: Apr. 22, 2019

(87) PCT Pub. No.: WO2018/079532
PCT Pub. Date: May 3, 2018

(65) Prior Publication Data
US 2019/0267895 A1 Aug. 29, 2019

(30) Foreign Application Priority Data
Oct. 26, 2016 (JP) ................................ 2016-209680

(51) Int. Cl.
*H02M 3/155* (2006.01)
*H02M 3/156* (2006.01)
*H02M 3/158* (2006.01)

(52) U.S. Cl.
CPC .................................. *H02M 3/155* (2013.01)

(58) Field of Classification Search
CPC ......... G05F 3/24; H02M 3/155; H02M 3/156; H02M 3/158
See application file for complete search history.

(56) References Cited

U.S. PATENT DOCUMENTS 5,930,127 A * 7/1999 Iwahori ................ H02M 1/425
315/247
6,108,225 A * 8/2000 Iwahori ................ H02M 7/217
363/132

(Continued)

FOREIGN PATENT DOCUMENTS

JP 2005-261059 A 9/2005
JP 2014-236620 A 12/2014

OTHER PUBLICATIONS

International Search Report, Application No. PCT/JP2017/038313, dated Dec. 12, 2017. ISA/Japan Patent Office.

*Primary Examiner* — Adolf D Berhane
*Assistant Examiner* — Sisay G Tiku
(74) *Attorney, Agent, or Firm* — Honigman LLP

(57) ABSTRACT

A DC-DC converter is provided with: a first switching circuit in which a first element unit and a second element unit are provided in series between a first conductive path and a reference conductive path; a second switching circuit in which a third element unit and a fourth element unit are provided in series between the first conductive path and the reference conductive path; a first inductor that is connected between a connection node that connects the third element unit and the fourth element unit, and a second conductive path; and a second inductor that is connected between a connection node that connects the first element unit and the second element unit, and the connection node that connects (Continued)

the third element unit and the fourth element unit. A drive unit controls the first switching circuit and the second switching circuit.

6 Claims, 24 Drawing Sheets

(56) References Cited

U.S. PATENT DOCUMENTS

| | | | | |
|---|---|---|---|---|
| 7,110,269 | B2* | 9/2006 | Cao | H02M 3/3376 |
| | | | | 315/209 R |
| 8,493,039 | B2* | 7/2013 | Guo | H02M 3/158 |
| | | | | 323/225 |
| 9,570,973 | B2* | 2/2017 | Chen | H02M 1/4208 |
| 10,014,777 | B1* | 7/2018 | Shumkov | H02M 3/1582 |
| 2004/0257272 | A1* | 12/2004 | Jacobson | H01Q 3/26 |
| | | | | 342/175 |
| 2010/0061122 | A1* | 3/2010 | Okubo | H02M 3/158 |
| | | | | 363/20 |
| 2010/0135054 | A1* | 6/2010 | Zacharias | H02J 3/38 |
| | | | | 363/132 |
| 2010/0246231 | A1* | 9/2010 | Sirio | H02M 3/1588 |
| | | | | 363/132 |
| 2011/0169466 | A1* | 7/2011 | Kuan | H02M 3/1582 |
| | | | | 323/282 |
| 2013/0314070 | A1* | 11/2013 | Shinohara | G05F 3/24 |
| | | | | 323/351 |
| 2015/0207424 | A1* | 7/2015 | Okamoto | H02M 3/33569 |
| | | | | 363/17 |
| 2018/0301987 | A1* | 10/2018 | Abe | H02M 3/155 |
| 2019/0109530 | A1* | 4/2019 | Perreault | H02M 3/158 |

* cited by examiner

DC-DC CONVERTER

CROSS-REFERENCE TO RELATED APPLICATIONS

This application is the U.S. national stage of PCT/JP2017/038313 filed Oct. 24, 2017, which claims priority of Japanese Patent Application No. JP 2016-209680 filed Oct. 26, 2016, the contents of which are incorporated herein.

TECHNICAL FIELD

The present disclosure relates to a DC-DC converter.

BACKGROUND

In DC-DC converters, switching losses occur when switching elements are turned on and off, and thus it is desirable to suppress such losses. As a method for suppressing a switching loss, a method has been proposed as disclosed in JP 2014-236620A. JP 2014-236620A discloses a technique that relates to a soft switching method in which a switching element is operated using a zero current or a zero voltage, and specifically discloses a configuration in which a step-up/down circuit unit includes a resonance capacitor and an inductor, and a resonance phenomenon is used to perform a soft switching operation.

However, if a configuration as in the DC-DC converter disclosed in JP 2014-236620A is employed in which a resonance phenomenon is used to perform a soft switching operation, the use of the resonance phenomenon is likely to cause the problems that high voltage resistance and a complicated control system are required.

For example, when the method disclosed in JP 2014-236620A is used, an excessive resonance voltage or resonance current that instantaneously occurs needs to be dealt with, and thus the size of elements and the number of parallel connections tend to increase. Furthermore, because the resonance voltage or the resonance current need to be controlled, a complicated control system is required, and thus the number of elements tends to increase in this respect. Moreover, in the resonance method disclosed in JP 2014-236620A, because, due to the resonance, a much larger voltage than a high voltage-side voltage is applied to each element of a switching circuit, it is necessary to select, as a switching element such as an FET, a member that withstands a larger voltage than in a case where no resonance method is selected, resulting in an increase in on-resistance of the elements.

The present disclosure was made in view of the aforementioned circumstances, and it is an object thereof to realize a DC-DC converter that can suppress switching loss, with a simpler configuration and a lower withstand voltage.

SUMMARY

A DC-DC converter according to one aspect of the present disclosure includes a first switching circuit that includes a first element unit having a switching element electrically connected to a first conductive path, and a second element unit having a diode that is disposed between the first element unit and a reference conductive path, the diode's anode being electrically connected to the reference conductive path side, the diode's cathode being electrically connected to the first element unit side, the reference conductive path being kept at a potential lower than a potential of the first conductive path, the first element unit and the second element unit being provided in series between the first conductive path and the reference conductive path. A second switching circuit includes a third element unit having a switching element electrically connected to the first conductive path, and a fourth element unit having a diode that is disposed between the third element unit and the reference conductive path, the diode's anode being electrically connected to the reference conductive path side, the diode's cathode being electrically connected to the third element unit side, the third element unit and the fourth element unit being provided in series between the first conductive path and the reference conductive path, and being arranged in parallel with the first switching circuit. A first inductor has one end electrically connected to a connection node that connects the third element unit and the fourth element unit, and another end electrically connected to a second conductive path. A second inductor has one end electrically connected to a connection node that connects the first element unit and the second element unit, and another end electrically connected to the connection node that connects the third element unit and the fourth element unit; a drive unit configured to perform at least step-down control of alternately outputting an ON signal and an OFF signal to the first element unit, and alternately outputting an ON signal and an OFF signal to the third element unit, and step-up control of alternately outputting an ON signal and an OFF signal to the second element unit, and alternately outputting an ON signal and an OFF signal to the fourth element unit. A first capacitor has one electrode electrically connected to the first conductive path, and another electrode electrically connected to a connection node that connects the third element unit and the first inductor, the first capacitor being arranged in parallel with the third element unit. The first element unit includes a diode whose cathode is electrically connected to the first conductive path side, the diode's anode being electrically connected to the second element unit side. The second element unit includes a switching element disposed between the anode of the diode of the first element unit and the reference conductive path. The third element unit includes a diode whose cathode is electrically connected to the first conductive path side, the diode's anode being electrically connected to the fourth element unit side. The fourth element unit includes a switching element disposed between the anode of the diode of the third element unit and the reference conductive path. In the first element unit and the third element unit, a current is allowed to flow to the first conductive path side, and during an ON time period of at least the second element unit or the fourth element unit, a current flow from the first conductive path side is interrupted. In the second element unit and the fourth element unit, a current is allowed to flow from the reference conductive path side, and during an ON time period of at least the first element unit or the third element unit, a current flow toward the reference conductive path side is interrupted. The drive unit repeats control such that after first step-down control of outputting OFF signals to the first element unit and the third element unit, second step-down control of outputting an ON signal to the first element unit and maintaining the OFF signal to the third element unit is performed, and after the second step-down control, third step-down control of maintaining the ON signal to the first element unit and outputting an ON signal to the third element unit is performed, and after the third step-down control, fourth step-down control of outputting an OFF signal to the first element unit and maintaining the ON signal to the third element unit is performed, and after the fourth step-down control, the first step-down control is performed. The drive unit repeats control such that after first step-up control of outputting OFF signals to the second element unit and the fourth element unit, second step-up control of outputting an ON signal to the second element unit and maintaining the OFF signal to the fourth element unit is performed, and after the second step-up control, third step-up control of maintaining the ON signal to the second element unit and outputting an ON signal to the fourth element unit is performed, and after the third step-up control, fourth step-up control of outputting an OFF signal to the second element unit and maintaining the ON signal to the fourth element unit is performed, and after the fourth step-up control, the first step-up control is performed. The second step-down control is continued until the diode of the third element unit becomes conductive, and is switched to the third step-down control when the diode of the third element unit is conductive. During the third step-down control, the second element unit is kept non-conductive, and the third step-down control is switched to the fourth step-down control while the second element unit is kept non-conductive, and the fourth step-down control is performed so that the diode of the second element unit becomes conductive before a current flowing through the first element unit reaches 0. The second step-up control is continued until the diode of the fourth element unit becomes conductive, and is switched to the third step-up control when the diode of the fourth element unit is conductive. During the third step-up control, the first element unit is kept non-conductive, and the third step-up control is switched to the fourth step-up control while the first element unit is kept non-conductive, and the fourth step-up control is performed so that the diode of the first element unit becomes conductive before a current flowing through the second element unit reaches 0.

Advantageous Effects of Disclosure

According to the DC-DC converter of the first disclosure, the drive unit alternately repeats control of turning off the high-side switching elements (the first element unit and the third element unit) of the first switching circuit and the second switching circuit, and control of turning on the high-side switching elements. Also, during an ON time period of at least the high-side first element unit or third element unit, an inductor current that flows through the first inductor is generated in a state in which, in the low-side elements (the second element unit and the fourth element unit), a current flow to the reference conductive path side is interrupted and a current is allowed to flow from the reference conductive path side, and during an OFF time period of the high-side first element unit and third element unit, a current is allowed to flow toward the first inductor via the low-side elements, so that it is possible to step down a voltage applied to the first conductive path and output the stepped-down voltage to the second conductive path.

Furthermore, when controlling on/off of the high-side switching elements (the first element unit and the third element unit) to perform the step-down operation, the drive unit performs, after the first step-down control of outputting OFF signals to the first element unit and the third element unit, the second step-down control of outputting an ON signal to the first element unit and maintaining the OFF signal to the third element unit. In this control, when the first element unit is turned on in response to the shift from the first step-down control to the second step-down control, the current flowing through the first element unit will slowly increase due to an inductance component of the second inductor. Accordingly, it is possible to reliably suppress a switching loss that occurs when the first element unit is turned on.

Furthermore, the drive unit performs, after the second step-down control, the third step-down control of maintaining the ON signal to the first element unit and outputting an ON signal to the third element unit. In other words, the first element unit is turned on, and then the third element unit can be turned on with a delay, and thus it is possible that the third element unit is turned on after a current flowing thereinto via the first element unit and the second inductor has increased to some extent and the voltage across the third element unit has been reduced. Accordingly, it is also possible to reliably suppress a switching loss that occurs when the third element unit is turned on.

Furthermore, the drive unit performs, after the third step-down control, the fourth step-down control of outputting an OFF signal to the first element unit and maintaining the ON signal to the third element unit. In this way, when both the first element unit and the third element unit are ON, the first element unit can be turned off while the third element unit is maintained in the ON state, and thus the first element unit can be turned off in a state in which a current is partially flowing through the third element unit. Accordingly, it is possible to reliably suppress a switching loss that occurs when the first element unit is turned off, for at least a current that flows through the third element unit.

Furthermore, the drive unit alternately repeats control of turning off the low-side switching elements (the second element unit and the fourth element unit) of the first switching circuit and the second switching circuit, and control of turning on the low-side switching elements. Also, during an ON time period of at least the low-side second element unit or fourth element unit, an inductor current that flows through the first inductor is generated in a state in which, in the high-side elements (the first element unit and the third element unit), a current flow from the first conductive path side is interrupted and a current is allowed to flow toward the first conductive path, and during an OFF time period of the low-side second element units and fourth element unit, the current that flows through the first inductor is allowed to flow into the first conductive path via the high-side elements, so that it is possible to step up a voltage applied to the second conductive path and output the stepped-up voltage to the first conductive path.

Furthermore, when controlling on/off of the low-side switching elements (the second element unit and the fourth element unit) to perform the step-up operation, the drive unit performs, after the first step-up control of outputting OFF signals to the second element unit and the fourth element unit, the second step-up control of outputting an ON signal to the second element unit and maintaining the OFF signal to the fourth element unit. In this control, when the second element unit is turned on in response to the shift from the first step-up control to the second step-up control, the current flowing through the second element unit will slowly increases due to an inductance component of the second inductor. Accordingly, it is possible to reliably suppress a switching loss that occurs when the second element unit is turned on.

Furthermore, the drive unit performs, after the second step-up control, the third step-up control of maintaining the ON signal to the second element unit and outputting an ON signal to the fourth element unit. In other words, the second element unit is turned on, and then the fourth element unit can be turned on with a delay, and thus it is possible that the fourth element unit is turned on after the voltage across the fourth element unit has decreased. Accordingly, it is also possible to reliably suppress a switching loss that occurs when the fourth element unit is turned on.

Furthermore, the drive unit performs, after the third step-up control, the fourth step-up control of outputting an OFF signal to the second element unit and maintaining the ON signal to the fourth element unit. In this way, when both the second element unit and the fourth element unit are ON, the second element unit can be turned off while the fourth element unit is maintained in the ON state. With this operation, it is also possible to reliably suppress a switching loss that occurs when the fourth element unit is turned off.

Furthermore, as a result of the first capacitor provided in parallel with the third element unit in this way, when the third element unit is turned off at the time of the shift from the fourth step-down control to the first step-down control, the voltage across the third element unit slowly increases compared to a case where no such first capacitor is provided. Accordingly, it is also possible to reliably suppress a switching loss that occurs when the third element unit is turned off.

DETAILED DESCRIPTION OF PREFERRED EMBODIMENTS

Hereinafter, preferred examples of the present disclosure will be described.

The DC-DC converter according to the present disclosure may further includes a second capacitor that has one electrode electrically connected to a connection node that connects the fourth element unit and the first inductor, and another electrode electrically connected to the reference conductive path, the second capacitor being arranged in parallel with the fourth element unit.

As a result of the second capacitor is provided in parallel with the fourth element unit in this way, when the fourth element unit is turned off at the time of the shift from the fourth step-up control to the first step-up control, the voltage across the fourth element unit slowly increases compared to a case where no second capacitor is provided. Accordingly, it is also possible to reliably suppress a switching loss that occurs when the fourth element unit is turned off.

The DC-DC converters of the first and second disclosures may be such that an inductance of the second inductor is smaller than an inductance of the first inductor.

With this configuration, it is possible to realize a configuration that can reduce a switching loss while relatively suppressing the size of the second inductor.

According to the DC-DC converters of the first and second disclosures, a plurality of voltage conversion units may be provided, each voltage conversion unit being provided with the first switching circuit, the second switching circuit, the first inductor, and the second inductor, and each voltage conversion unit may be provided in parallel between the first conductive path and the second conductive path and may be electrically connected to the reference conductive path.

According to this configuration, it is possible to realize a multiphase DC-DC converter that can suppress switching loss, with a simpler configuration and a lower withstand voltage.

Embodiment 1

Hereinafter, more specific Embodiment 1 of the present disclosure will be described.

Figure 1:
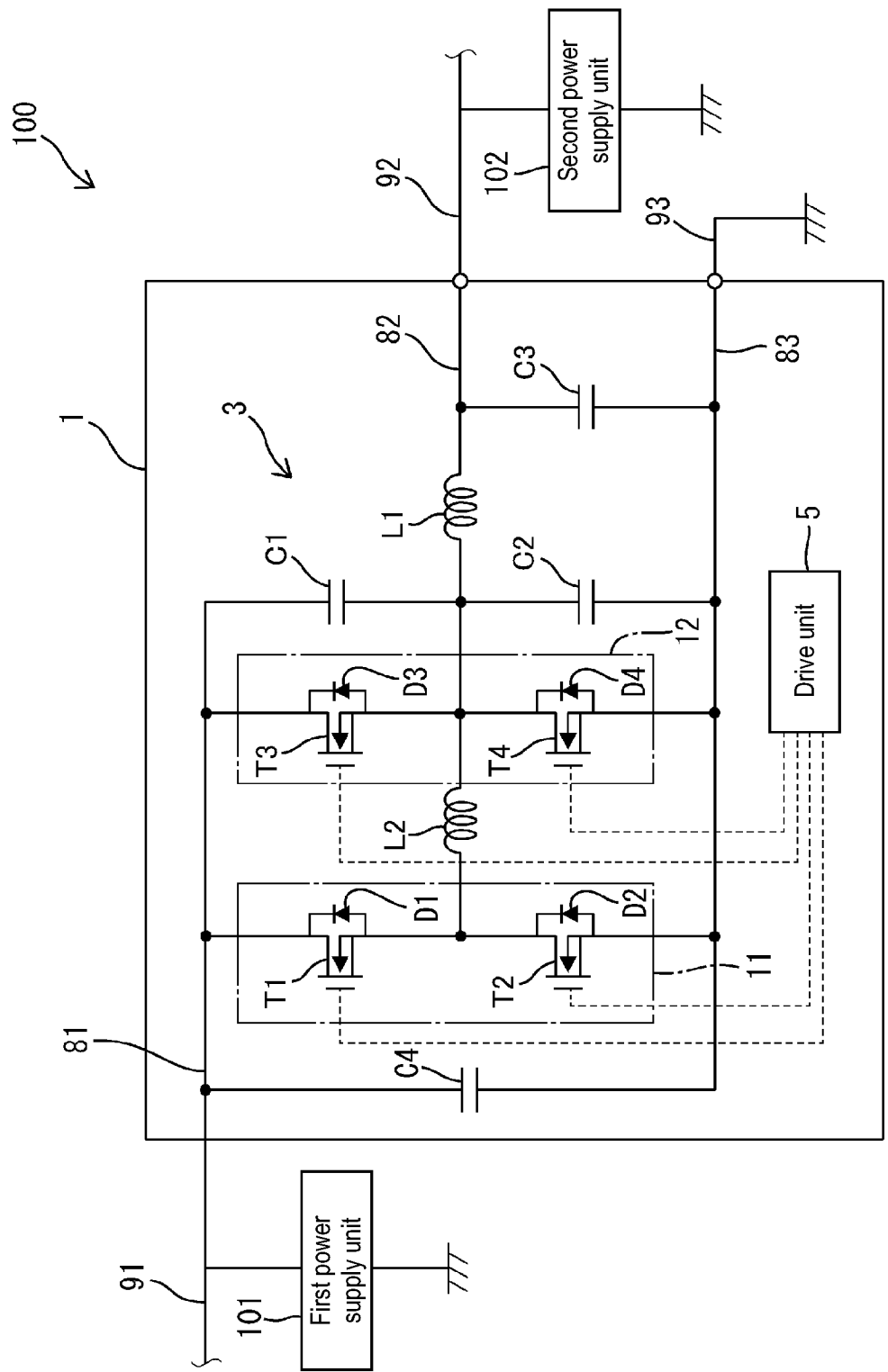
FIG. 1 is a circuit diagram schematically illustrating a DC-DC converter 1 according to Embodiment 1.

A DC-DC converter 1 shown in FIG. 1 is configured as, for example, an on-board DC-DC converter, which is installed in a vehicle and performs voltage conversion, and constitutes part of an on-board power supply system 100 shown in FIG. 1. The on-board power supply system 100 is provided with a first power supply unit 101, a second power supply unit 102, and the DC-DC converter 1, and is configured as a system that can supply electric power to various electrical components installed in the vehicle.

The first power supply unit 101 is constituted by, for example, an electrical storage means such as a lithium-ion battery or an electrical double-layer capacitor, and is configured to generate a predetermined first voltage. For example, the high-potential side terminal of the first power supply unit 101 is kept at 48V, and the low-potential side terminal is kept at the ground potential (0V).

A wiring part 91 that is electrically connected to the high-potential side terminal of the first power supply unit 101 is a conductive path that is electrically connected to a later-described first conductive path 81, and an output voltage (of 48V, for example) of the first power supply unit 101 is applied thereto when the DC-DC converter 1 is stopped or when a later-described step-down operation is performed.

The second power supply unit 102 is constituted by, for example, an electrical storage means such as a lead storage battery, and is configured to generate a predetermined second voltage that is lower than the predetermined first voltage generated by the first power supply unit 101. For example, the high-potential side terminal of the second power supply unit 102 is kept at 12V, and the low-potential side terminal is kept at the ground potential (0V).

A wiring part 92 that is electrically connected to the high-potential side terminal of the second power supply unit 102 is a conductive path that is electrically connected to a later-described second conductive path 82, and an output voltage (of 12V, for example) of the second power supply unit 102 is applied thereto when the DC-DC converter 1 is stopped or when a later-described step-up operation is performed.

The DC-DC converter 1 is configured as a bi-directional step-up/down converter that can perform a step-down operation for stepping down a direct voltage applied to the first conductive path 81 and applying the desired output voltage to the second conductive path 82, and can perform a step-up operation for stepping up a direct voltage applied to the second conductive path 82 and applying the desired output voltage to the first conductive path 81.

The DC-DC converter 1 is provided with the above-described first conductive path 81 connected to the wiring part 91, the above-described second conductive path 82 connected to the wiring part 92, and a reference conductive path 83 that is kept at a constant reference potential lower than the potentials of the first conductive path 81 and the second conductive path 82. The DC-DC converter 1 is further provided with, for example, a voltage conversion unit 3, a drive unit 5, and a current detection unit and a voltage detection unit that are not shown.

The first conductive path 81 is configured as a primary side (high-voltage side) power supply line to which a relatively high voltage is applied. This first conductive path 81 is conductively connected to the high-potential side terminal of the first power supply unit 101, and is configured such that a predetermined direct voltage is applied thereto from the first power supply unit 101.

The second conductive path 82 is configured as a secondary side (low voltage side) power supply line to which a relatively low voltage is applied. The second conductive path 82 is conductively connected to, for example, the high-potential side terminal of the second power supply unit 102, and is configured such that a direct voltage lower than the output voltage of the first power supply unit 101 is applied thereto from the second power supply unit 102.

The reference conductive path 83 is electrically connected to a ground part 93 provided outside of the DC-DC converter 1. The ground part 93 is kept at the ground potential of 0V, and the reference conductive path 83 is also kept at this ground potential.

The voltage conversion unit 3 is provided with a first switching circuit 11, a second switching circuit 12, a first inductor L1, a second inductor L2, a first capacitor C1, a second capacitor C2, inputoutput capacitors C3 and C4, and the like.

The first switching circuit 11 has a configuration in which a first element unit T1, which is a high-side element, and a second element unit T2, which is a low-side element, are arranged in series between the first conductive path 81 and the reference conductive path 83.

The first element unit T1 is configured as, for example, an N-channel MOSFET whose drain is electrically connected to the first conductive path 81, and whose source is electrically connected to one end of the second inductor L2 and the drain of the second element unit T2. Furthermore, the first element unit T1 includes a diode D1 serving as a body diode. The diode D1 has a configuration in which the cathode of the diode D1 is electrically connected to the first conductive path 81, and the anode of the diode D1 is electrically connected to the one end of the second inductor L2 and the drain of the second element unit T2.

The second element unit T2 is configured as, for example, an N-channel MOSFET whose drain is electrically connected to the source of the first element unit T1 and the one end of the second inductor L2, and whose source is electrically connected to the reference conductive path 83. Furthermore, the second element unit T2 includes a diode D2 serving as a body diode. The diode D2 has a configuration in which the cathode of the diode D2 is electrically connected to the source of the first element unit T1 and the one end of the second inductor L2, and the anode of the diode D2 is electrically connected to the reference conductive path 83.

The second switching circuit 12 has a configuration in which a third element unit T3, which is a high-side element, and a fourth element unit T4, which is a low side element, are arranged in series between the first conductive path 81 and the reference conductive path 83, and are arranged in parallel with the first switching circuit 11.

The third element unit T3 is configured as, for example, an N-channel MOSFET whose drain is electrically connected to the first conductive path 81, and whose source is electrically connected to the other end of the second inductor L2, the drain of the fourth element unit T4, and one end of the first inductor L1. Furthermore, the third element unit T3 includes a diode D3 serving as a body diode. The diode D3 has a configuration in which the cathode of the diode D3 is electrically connected to the first conductive path 81, and the anode of the diode D3 is electrically connected to the other end of the second inductor L2, the drain of the fourth element unit T4, and the one end of the first inductor L1.

The fourth element unit T4 is configured as, for example, an N-channel MOSFET whose drain is electrically connected to the source of the third element unit T3, the other end of the second inductor L2, and the one of the first inductor L1, and whose source is electrically connected to the reference conductive path 83. Furthermore, the fourth element unit T4 includes a diode D4 serving as a body diode. The diode D4 has a configuration in which the cathode of the diode D4 is electrically connected to the source of the third element unit T3, the other end of the second inductor L2, and the one of the first inductor L1, and the anode of the diode D4 is electrically connected to the reference conductive path 83.

The one end of the first inductor L1 is electrically connected to a connection node that connects the third element unit T3 and the fourth element unit T4 (specifically a conductive path that connects the source of the third element unit T3, the drain of the fourth element unit T4, and the other end of the second inductor L2) and the other end of the first inductor L1 is electrically connected to the second conductive path 82.

The one end of the second inductor L2 is electrically connected to a connection node that connects the first element unit T1 and the second element unit T2 (specifically, a conductive path that connects the source of the first element unit T1 and the drain of the second element unit T2), and the other end of the second inductor L2 is electrically connected to the connection node that connects the third element unit T3 and the fourth element unit T4 (specifically, the conductive path that connects the source of the third element unit T3 and the drain of the fourth element unit T4).

One electrode of the first capacitor C1 is electrically connected to the first conductive path 81, and is electrically connected to the drains of the first element unit T1 and the third element unit T3. The other electrode of the first capacitor C1 is electrically connected to a connection node (conductive path) that connects the source of the third element unit T3 and the first inductor L1. With this connection configuration, the first capacitor C1 is arranged in parallel with the third element unit T3.

One electrode of the second capacitor C2 is electrically connected to a connection node (conductive path) that connects the drain of the fourth element unit T4 and the first inductor L1, and the other electrode thereof is electrically connected to the reference conductive path 83. With this connection configuration, the second capacitor C2 is arranged in parallel with the fourth element unit T4.

The drive unit 5 is provided with a control circuit (such as a microcomputer) that includes, for example, a CPU, a ROM, a RAM, an AD converter, and the like, and can output, to the respective gates of the first element unit T1, the second element unit T2, the third element unit T3, and the fourth element unit T4, ON signals for turning the corresponding element units on, or an OFF signal for turning the corresponding element units off.

The DC-DC converter 1 is provided with a not-shown first voltage detection circuit for detecting a voltage of the first conductive path 81. It is sufficient that the first voltage detection circuit is configured to be able to input a value that indicates the voltage of the first conductive path 81 to the drive unit 5. The first voltage detection circuit may be a circuit for directly inputting the value (analog voltage value) of a voltage applied to the circuit first conductive path 81 to the drive unit 5, or a circuit for inputting, to the drive unit 5, a divided analog voltage value obtained by the voltage applied to the first conductive path 81 being divided using a voltage-dividing circuit. Furthermore, the DC-DC converter 1 is provided with a first current detection circuit for detecting a current flowing through the first conductive path 81. The first current detection circuit is configured as a known current detection circuit, and may be, for example, a circuit that includes a resistor and a differential amplifier on the first conductive path 81, and may be configured to amplify a voltage drop occurring at the resistor using the differential amplifier, and input the amplified value as an analog voltage value to the drive unit 5.

The DC-DC converter 1 is provided with a not-shown second voltage detection circuit for detecting a voltage of the second conductive path 82. It is sufficient that the second voltage detection circuit is configured to be able to input a value that indicates the voltage of the second conductive path 82 to the drive unit 5. The second voltage detection circuit may be a circuit for directly inputting the value (analog voltage value) of the voltage applied to the second conductive path 82 to the drive unit 5, or a circuit for inputting, to the drive unit 5, a divided analog voltage value obtained by the voltage applied to the second conductive path 82 being divided using a voltage-dividing circuit. Furthermore, the DC-DC converter 1 is provided with a second current detection circuit for detecting a current flowing through the second conductive path 82. The second current detection circuit is configured as a known current detection circuit, and may be, for example, a circuit that includes a resistor and a differential amplifier on the second conductive path 82, and may be configured to amplify a voltage drop occurring at the resistor using the differential amplifier and input the amplified value as an analog voltage value to the drive unit 5.

The DC-DC converter 1 is provided with an input/output capacitor C4, which is arranged between the first conductive path 81 and the reference conductive path 83, and an input/output capacitor C3, which is arranged between the second conductive path 82 and the reference conductive path 83.

The following will describe a step-down operation that is performed by the DC-DC converter 1.

When a predetermined condition for starting a step-down operation is met, the drive unit 5 starts a driving operation of stepping down a voltage applied to the first conductive path 81 and applying the stepped-down voltage to the second conductive path 82. There is no particular limitation to "when a predetermined condition for starting a step-down operation is met". This may be, for example, a timing at which an ignition switch is switched from off to on, or a timing at which a step-down instruction is given to the DC-DC converter 1 from an external device arranged outside of the DC-DC converter 1, for example.

After the predetermined condition for starting a step-down operation is met, the drive unit 5 performs step-down control of alternately outputting an ON signal and an OFF signal to the gate of the first element unit T1, and alternately outputting an ON signal and an OFF signal to the gate of the third element unit T3, and causes the voltage conversion unit 3 to perform a step-down operation of stepping down a voltage applied to the first conductive path 81 and applying the stepped-down voltage to the second conductive path 82.

Figure 2:
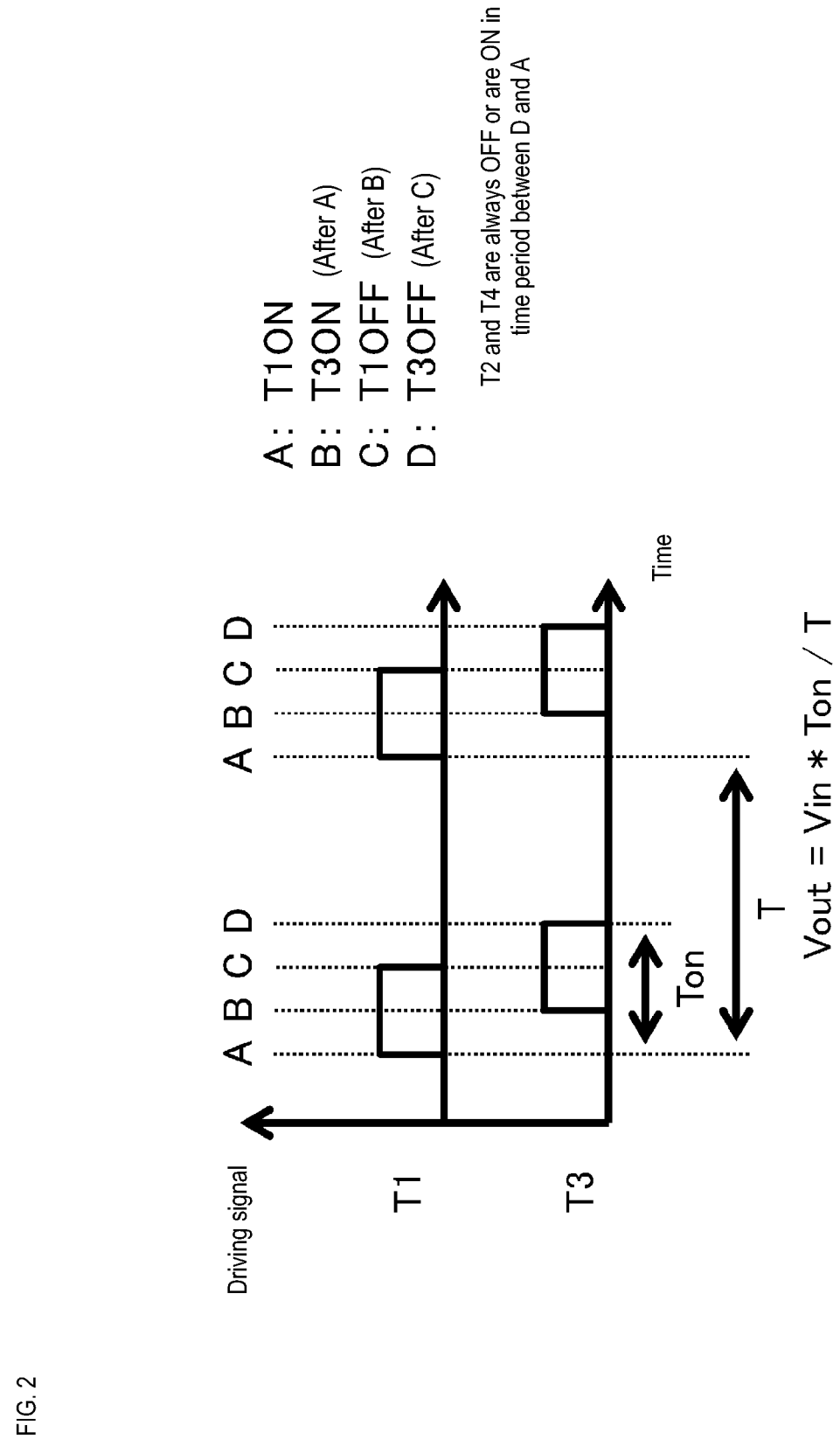
FIG. 2 is a diagram illustrating PWM signals and the like that are given to a first element unit and a third element unit during step-down control.

Specifically, as shown in FIG. 2, the drive unit 5 outputs a PWM signal serving as a driving signal to the gate of the first element unit T1, and outputs, to the gate of the third element unit T3, a PWM signal serving as a driving signal with its phase shifted from that of the PWM signal output to the gate of the first element unit T1. The PWM signal that is output to the gate of the first element unit T1 by the drive unit 5 has the same duty ratio as that of the PWM signal that is output to the gate of the third element unit T3, and specifically the duty ratio of the PWM signals is adjusted by feedback control so that the voltage (output voltage) that is applied to the second conductive path 82 is set to a desired target voltage. As shown by the formula shown in the lower part of FIG. 2, an output voltage Vout that is applied to the second conductive path 82 is determined by an input voltage Vin that is applied to the first conductive path 81, a cycle T of the PWM signals shown in FIG. 2, and an output time period (from later-described times A to D) in which an ON signal is output to at least any of the first element unit T1 and the third element unit T3.

FIG. 2 is a timing chart schematically illustrating the PWM signal that is given to the gate of the first element unit T1 and the PWM signal that is given to the gate of the third element unit T3, when the drive unit 5 performs the step-down control. In FIG. 2, a time A is a timing at which an ON time of the PWM signal that is given to the gate of the first element unit T1 is started, a time B is a timing at which an ON time of the PWM signal that is given to the gate of the third element unit T3 is started, a time C is a timing at which an OFF time of the PWM signal that is given to the gate of the first element unit T1 is started, and a time D is a timing at which an OFF time of the PWM signal that is given to the gate of the third element unit T3 is started. As shown in FIG. 2, when performing the step-down control, the drive unit 5 performs first step-down control of outputting OFF signals to the first element unit T1 and the third element unit T3, and then performs second step-down control of outputting an ON signal to the first element unit T1 and maintaining the OFF signal to the third element unit T3. In the example of FIG. 2, a time period between the time D and the time A is a time period in which the drive unit 5 performs the first step-down control, and in this time period, both the first element unit T1 and the third element unit T3 are maintained in the OFF state. Also, a time period between the time A and the time B is a time period in which the drive unit 5 performs the second step-down control, and in this time period, the first element unit T1 is maintained in the ON state and the third element unit T3 is maintained in the OFF state.

After the above-described second step-down control, the drive unit 5 performs third step-down control of maintaining the ON signal to the first element unit T1 and outputting an ON signal to the third element unit T3. In the example of FIG. 2, the time period from the time B to the time C is a time period in which the drive unit 5 performs the third step-down control, and in this time period, both the first element unit T1 and the third element unit T3 are maintained in the ON state. Then, after the third step-down control, the drive unit 5 performs fourth step-down control of outputting an OFF signal to the first element unit T1 and maintaining the ON signal to the third element unit T3. In the example of FIG. 2, a time period between the time C and the time D is a time period in which the drive unit 5 performs the fourth step-down control, and in this time period, the first element unit T1 is maintained in the OFF state and the third element unit T3 is maintained in the ON state. Then, the drive unit 5 repeats control such that the first step-down control is performed after the fourth step-down control. In other words, the drive unit 5 performs the first step-down control, the second step-down control, the third step-down control, and the fourth step-down control in the stated order, which can be regarded as one cycle, and repeats a plurality of such cycles.

When performing the step-down control in this way, the drive unit 5 may always give OFF signals to the gates of the second element unit T2 and the fourth element unit T4, or may also give ON signals to the gates of the second element unit T2 and the fourth element unit T4 while giving OFF signals to both the first element unit T1 and the third element unit T3 (that is, the time period D-A between the time D and the time A).

Hereinafter, operations that are performed during the step-down control will be described in more detail. Note that the following description is given on the assumption that the forward direction voltages Vf of the body diodes D1, D2, D3, and D4 of the first element unit T1, the second element unit T2, the third element unit T3, and the fourth element unit T4 are substantially 0V (Vf≈0). Furthermore, in FIGS. 4, 6, 8, 10, and 12, the changes in voltages across the first element unit T1, the second element unit T2, the third element unit T3, and the fourth element unit T4 are shown in the upper portion, the changes in currents flowing through the first element unit T1, the second element unit T2, the third element unit T3, and the fourth element unit T4 are shown in the middle portion, and switching loss that may occur in the first element unit T1, the second element unit T2, the third element unit T3, and the fourth element unit T4 is shown in the lower portion. In the graphs, changes that correspond to the first element unit T1 are indicated by solid lines, changes that correspond to the second element unit T2 are indicated by dashed lines, changes that correspond to the third element unit T3 are indicated by long-short dashed lines, and changes that correspond to the fourth element unit T4 are indicated by long-short-short dashed lines. Furthermore, in the following description, as a representative example, a case is taken where the voltage applied to the first conductive path 81 is set to Vin and Vin is 48V. Note that, in the circuit diagrams such as FIGS. 3, 5, 7, 9, and 11, the drive unit 5, the second power supply unit 102, and the like are omitted. Furthermore, a load 105 that is electrically connected to the second conductive path 82 is illustrated in a simplified manner. Note that in FIGS. 4, 6, 8, 10, 12, 13, 16, 18, 20, 22, 24, 25, and 27 that relate to the present description, changes in voltages, currents, and losses are indicated by solid lines, dashed lines, long-short dashed lines, and long-short-short dashed lines that correspond to the positions, but in these figures, portions in which a plurality of different types of lines are close and laterally parallel to each other refer to regions in which the plurality of lines that are parallel and close to each other indicate values nearly equal to each other. That is, in regions in which a plurality of lateral lines that indicate values nearly equal to each other overlap each other, the lines are shown while being slightly displaced from each other, for ease of illustration.

Figure 3:
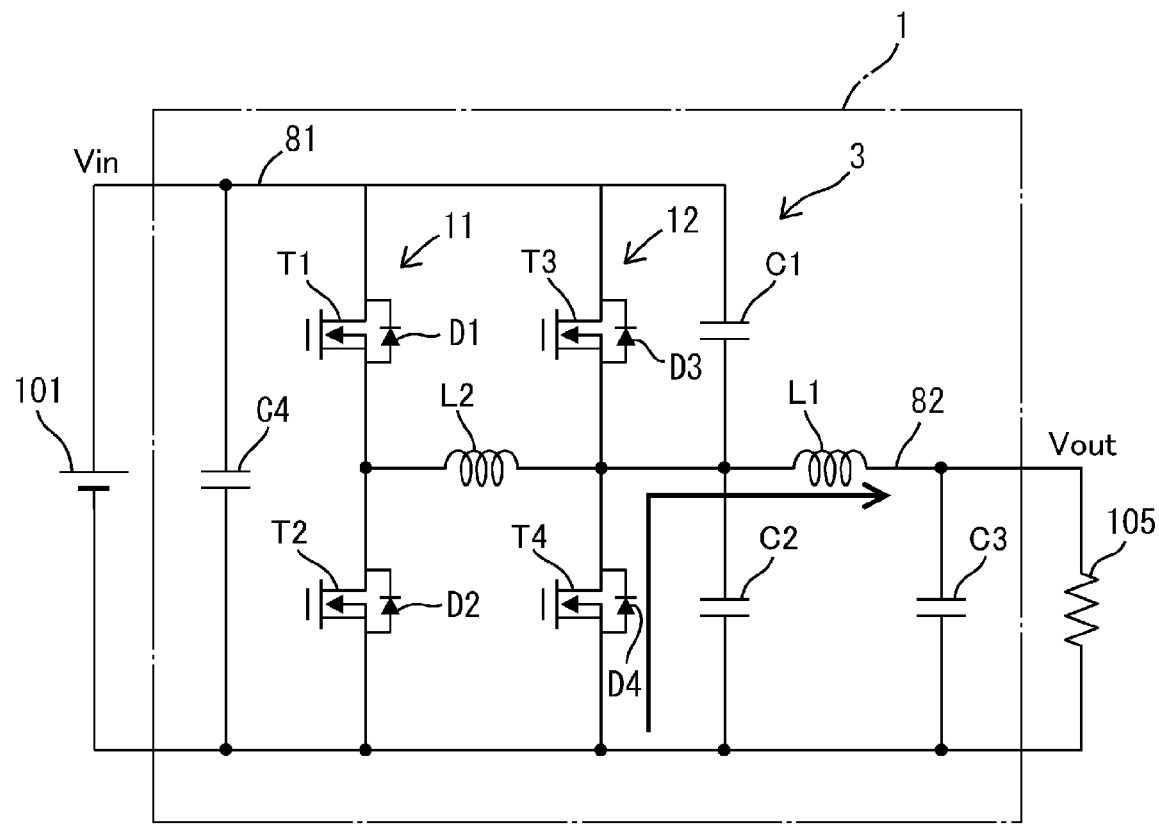
FIG. 3 is a diagram illustrating an operation that is performed before first step-down control is complete.
Figure 4:
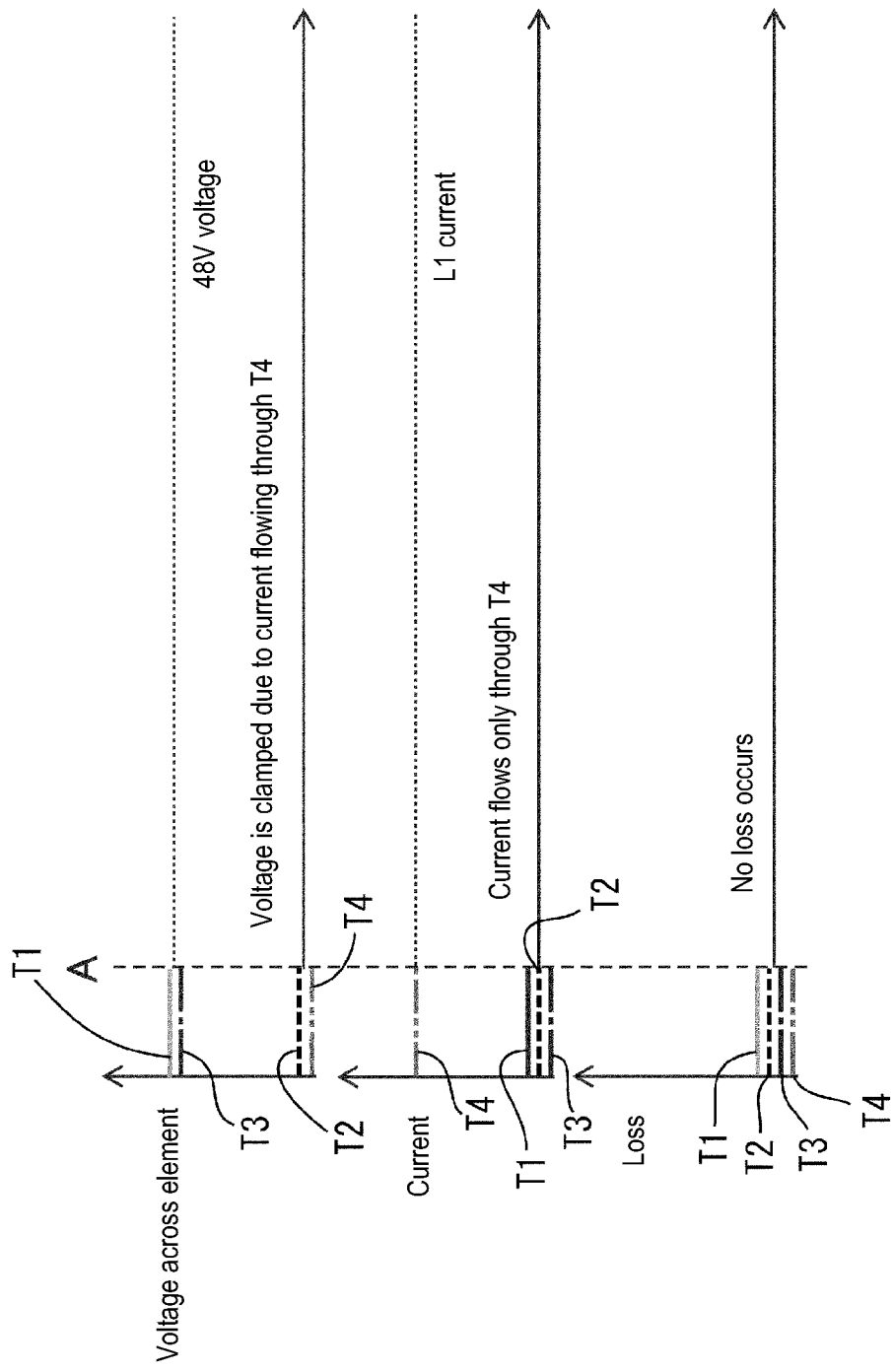
FIG. 4 is a graph illustrating, with time, a voltage between two ends of each element unit, a current flowing through the element unit, and a switching loss that occurs at the element unit before the first step-down control is complete.

First, an overview of an operation that is performed when the drive unit 5 executes the first step-down control will be described with reference to FIGS. 3, 4, and so on. Note that the first step-down control will also be described later.

The first step-down control is control that is executed after being switched to from the later-described fourth step-down control, and in which both the first element unit T1 and the third element unit T3 are turned off. As shown in FIG. 3, during the first step-down control, a current flows only through the diode (body diode) D4 of the fourth element unit T4, out of the first element unit T1, the second element unit T2, the third element unit T3, and the fourth element unit T4, and the current serves as an inductor current of the first inductor L1 (see also the graph in the middle portion of FIG. 4). Furthermore, due to the current flowing through the diode D4 of the fourth element unit T4, the terminal voltages at the first element unit T1, the second element unit T2, the third element unit T3, and the fourth element unit T4 are clamped. As shown in the graph in the upper portion of FIG. 4, the voltages across the first element unit T1 and the third element unit T3 are kept at about a potential difference between the first conductive path 81 and the reference conductive path 83 (48V in the following description), and the voltages across the second element unit T2 and the fourth element unit T4 are kept at substantially 0V. Note that, while the first step-down control is maintained, no switching loss occurs at the first element unit T1, the second element unit T2, the third element unit T3, and the fourth element unit T4, as shown in the graph in the lower portion of FIG. 4.

Next, an operation that is performed when the drive unit 5 switches the first step-down control to the second step-down control will be described with reference to FIGS. 5 and 6, and the like.

Figure 13:
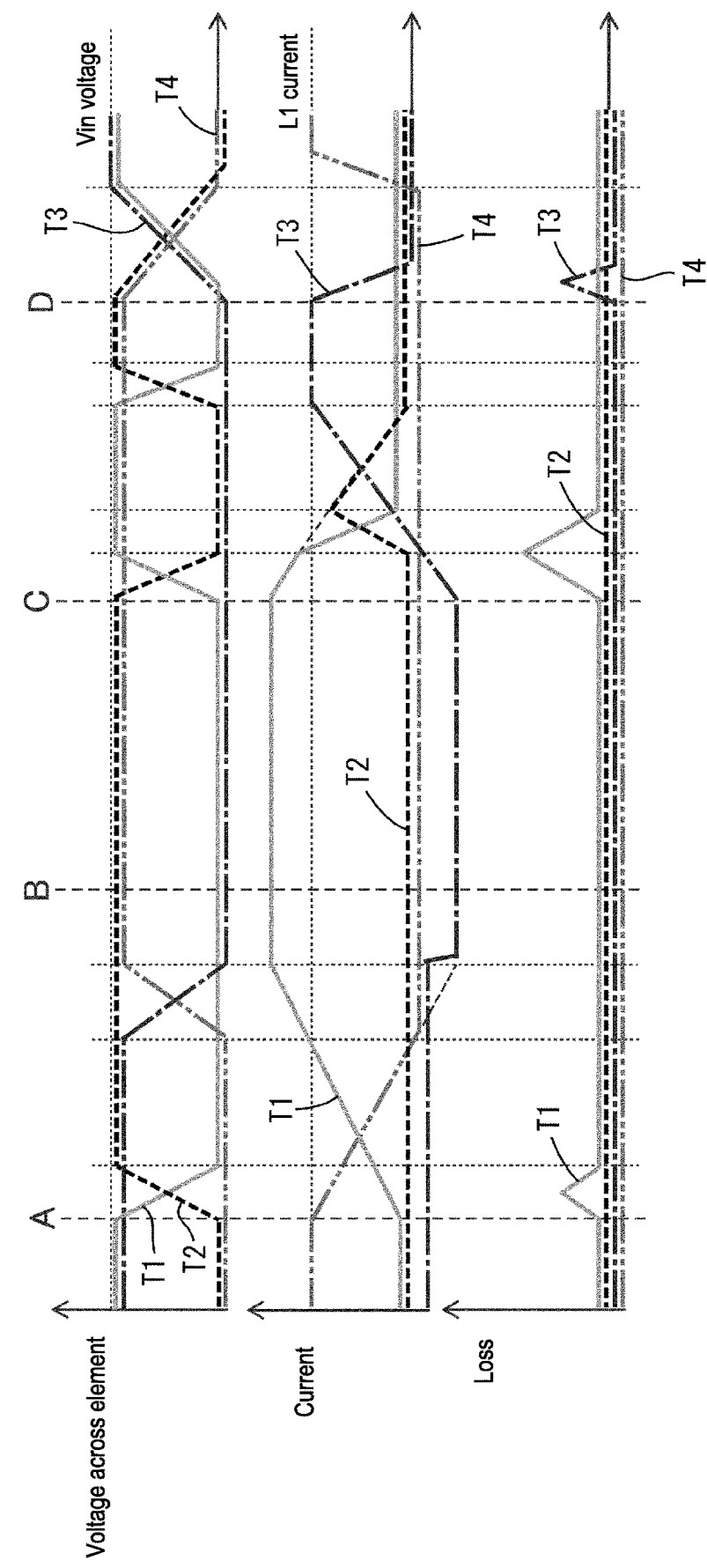
FIG. 13 is a graph illustrating, with time, a voltage between two ends of each element unit, a current flowing through the element unit, and a switching loss that occurs at the element unit during step-down control.

The second step-down control is control that is executed after being switched to from the first step-down control, and in which the first element unit T1 is turned on and the third element unit T3 is maintained in the OFF state. In the graphs of FIGS. 6 and 13, the second step-down control is performed in a time period between the time A, at which the first element unit T1 is turned on, and the time B, at which the third element unit T3 is turned on.

Figure 5:
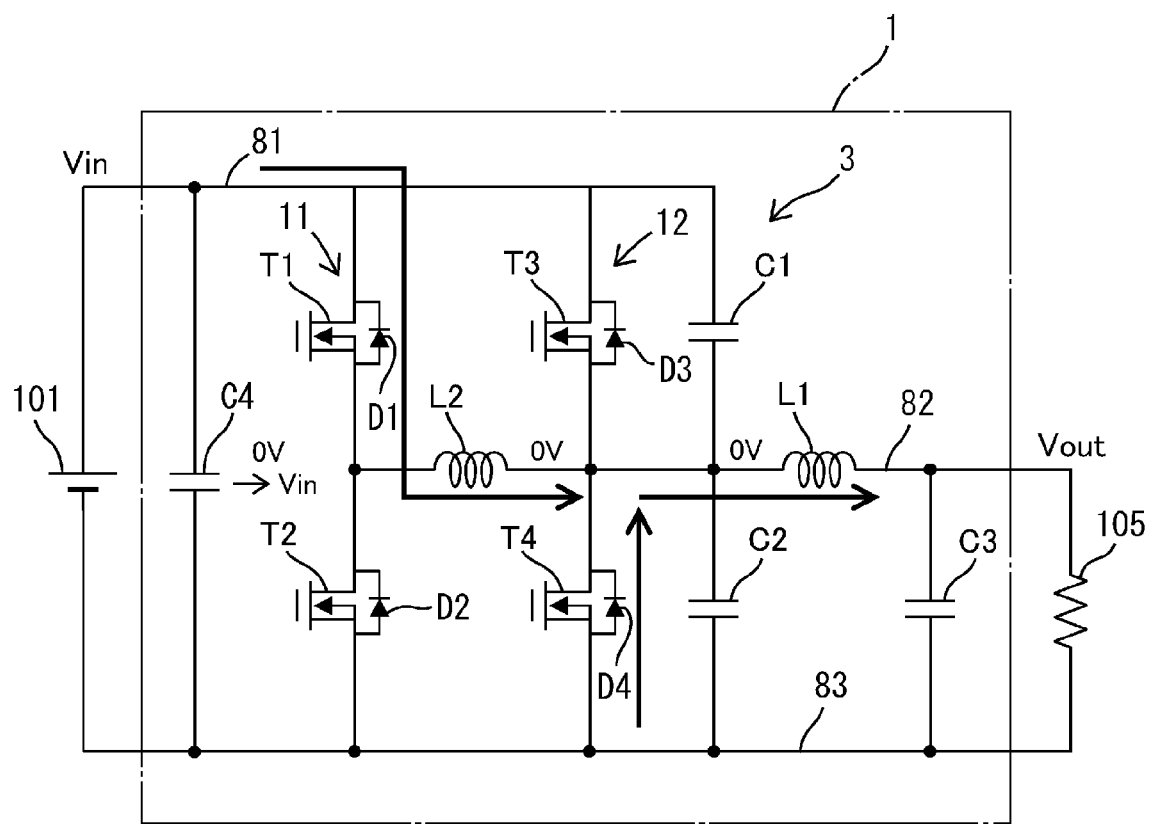
FIG. 5 is a diagram illustrating second step-down control.

Immediately after the execution of the second step-down control, as shown in FIG. 5, the current flowing through the first element unit T1 increases in accordance with the ON operation of the first element unit T1, while a current flows through the diode (body diode) D4 of the fourth element unit T4. At this time, as in a time period a1 shown in FIG. 6, due to the first element unit T1 being turned on at the time A, the voltage across the first element unit T1 abruptly decreases, and the voltage across the second element unit T2 increases in response to the decrease in the voltage across the first element unit T1 since no current flows through the second element unit T2. At this time, as shown in the graph in the middle portion of FIG. 6, the current flowing through the first element unit T1 will slowly increase due to the inductance component of the second inductor L2. Furthermore, during this operation, no surge voltage or current will occur that may be generated due to reverse recovery of the diode D2 (body diode) of the second element unit T2.

After, due to the operation in the time period a1, the voltage across the first element unit T1 has decreased to a value close to 0V, in the subsequent time period a2, the current flowing through the first element unit T1 gradually increases and reaches the value of a current flowing through the first inductor L1. On the other hand, the current flowing through the diode D4 of the fourth element unit T4 gradually decreases until it reaches 0 A.

In a time period a3 after the current flowing through the first element unit T1 has reached the value of the current flowing through the first inductor L1 and the current flowing through the diode D4 of the fourth element unit T4 has reached 0A, the value of the current flowing through the first element unit T1 further increases due to the presence of the second inductor L2. At this time, a surplus current obtained when the current flowing through the first element unit T1 has exceeded the value of the current flowing through the first inductor L1 is absorbed and adjusted through discharge and charge of the first capacitor C1 and the second capacitor C2. As a result of this adjustment, the voltage across the fourth element unit T4 increases to about the voltage Vin of the first conductive path 81, and the voltage across the third element unit T3 decreases to about 0V.

In this way, in a time period a4 after the voltage across the third element unit T3 has decreased to about 0V, the diode D3 (body diode) of the third element unit T3 becomes conductive, and the portion of the current flowing through the first element unit T1 that exceeds the inductor current of the first inductor L1 can flow to the first conductive path 81 side via the diode D3 (body diode) of the third element unit T3.

Figure 6:
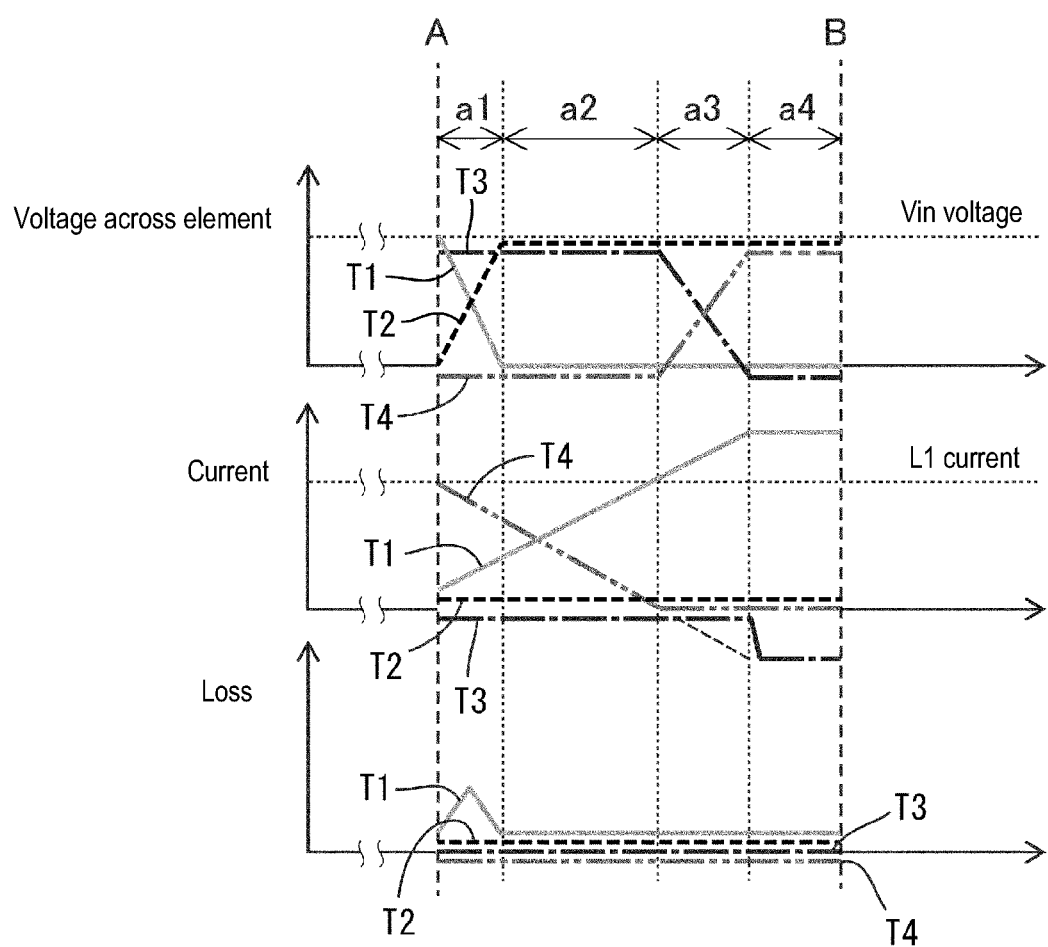
FIG. 6 is a graph illustrating, with time, a voltage between two ends of each element unit, a current flowing through the element unit, and a switching loss that occurs at the element unit during the second step-down control.

As shown in FIG. 6, in the time period in which the second step-down control is performed, a switching loss occurs immediately after the first element unit T1 is turned on, but the switching loss can be reduced since a current of the first element unit T1 is suppressed by the inductance component of the second inductor L2. Furthermore, the switching loss can further be reduced by increasing the inductance of the second inductor L2.

Next, an operation that is performed when the drive unit 5 switches the second step-down control to the third step-down control will be described with reference to FIGS. 7, 8, and so on.

The third step-down control is control that is executed after being switched to from the second step-down control, and in which the first element unit T1 is maintained in the ON state, and the third element unit T3 is turned on. In the graphs of FIGS. 8 and 13, the third step-down control is performed in a time period between the time B, at which the third element unit T3 is turned on, and the time C, at which the first element unit T1 is turned off.

Figure 7:
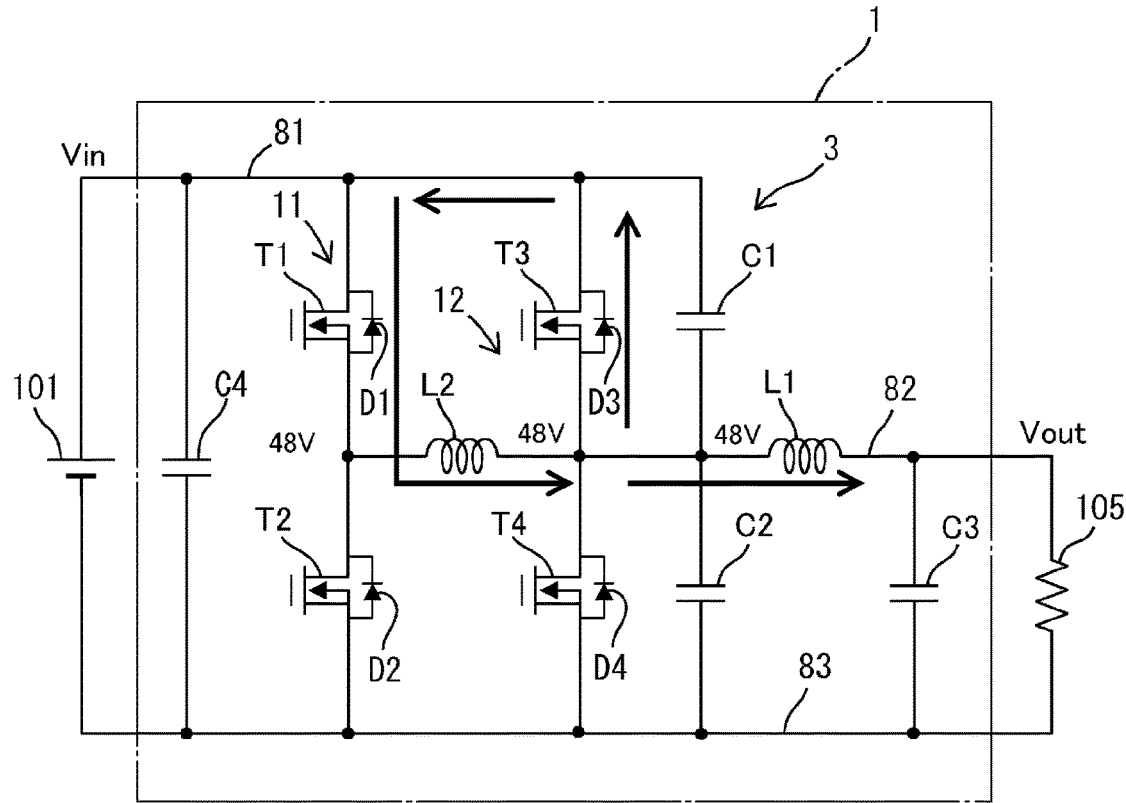
FIG. 7 is a diagram illustrating third step-down control.

Immediately after the execution of the third step-down control, as shown in FIG. 7, a state is maintained in which a current flows through the first element unit T1 toward the second inductor L2, and a current flows through the diode (body diode) D3 of the current third element unit T3 toward the first conductive path 81. Then, in the time period in which the third step-down control is executed, voltages at both ends of the second inductor L2 are equal to each other, and seek to maintain the current, and thus the current value does not change as shown in the middle portion of FIG. 8.

Figure 8:
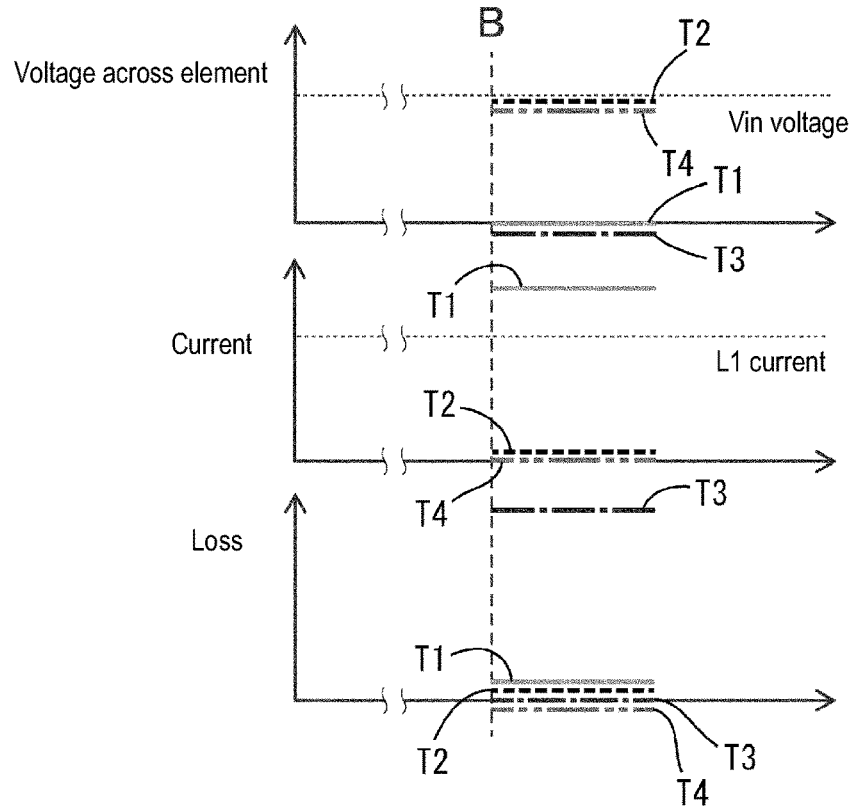
FIG. 8 is a graph illustrating, with time, a voltage between two ends of each element unit, a current flowing through the element unit, and a switching loss that occurs at the element unit during the third step-down control.

As shown in FIGS. 6 and 8, at the time B (at which the second step-down control is switched to the third step-down control), the voltage across the third element unit T3 is about 0V, and thus even if the third element unit T3 is turned on at the time B, the voltage hardly changes and a surge voltage and a current do not occur at the time of the ON operation. Since the voltage across the third element unit T3 is about 0V before and after it is turned on from off (that is, before and after the time B), no switching loss occurs as shown in the graph in the lower portion of FIG. 8.

Figure 9:
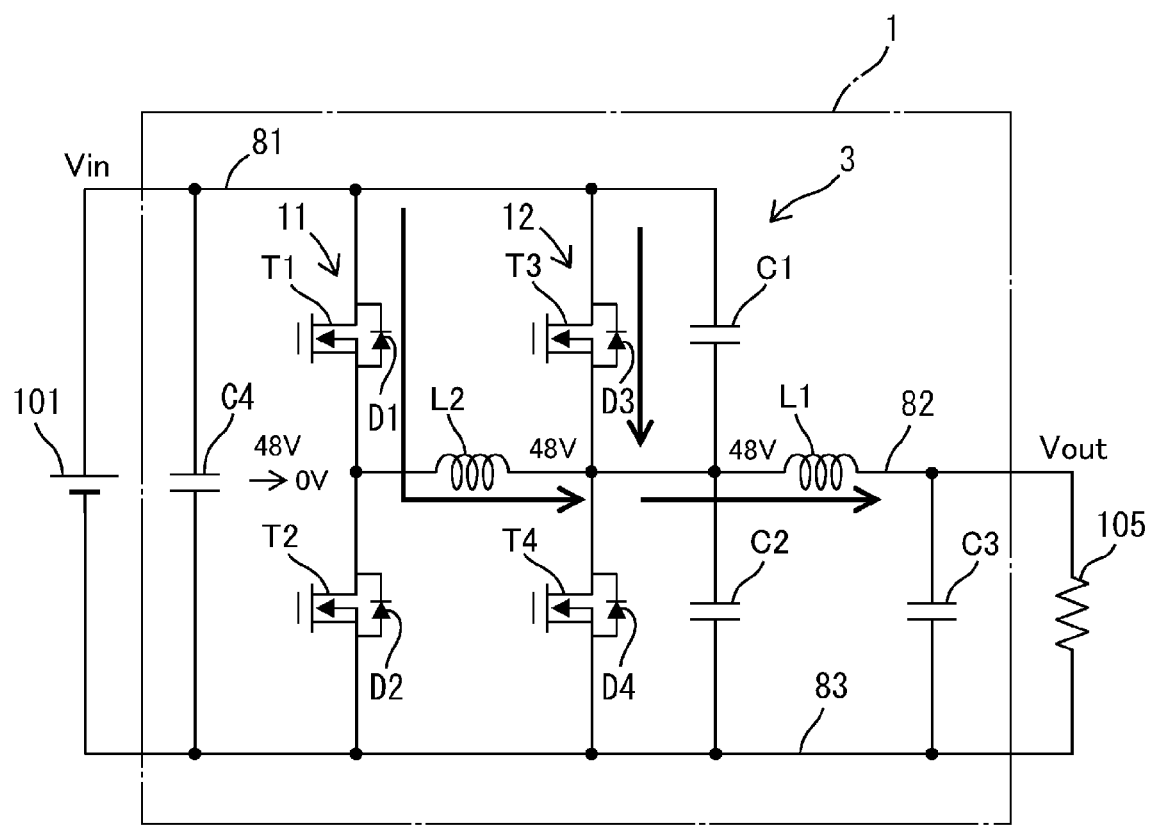
FIG. 9 is a diagram illustrating fourth step-down control.

Next, an operation that is performed when the drive unit 5 switches the third step-down control to the fourth step-down control will be described with reference to FIGS. 9, 10, and the like.

The fourth step-down control is control that is executed after being switched to from the third step-down control, and in which the third element unit T3 is maintained in the ON state, and the first element unit T1 is turned off. In the graphs of FIGS. 10 and 13, the fourth step-down control is performed in a time period between the time C, at which the first element unit T1 is turned off, and the time D, at which the third element unit T3 is turned off.

Immediately before the execution of the fourth step-down control, due to the third step-down control, a current was flowing through the first element unit T1 and a current was flowing through the diode (body diode) D3 of the third element unit T3 (see FIG. 8), and in this state, the fourth step-down control is started so that the first element unit T1 is turned off.

Figure 10:
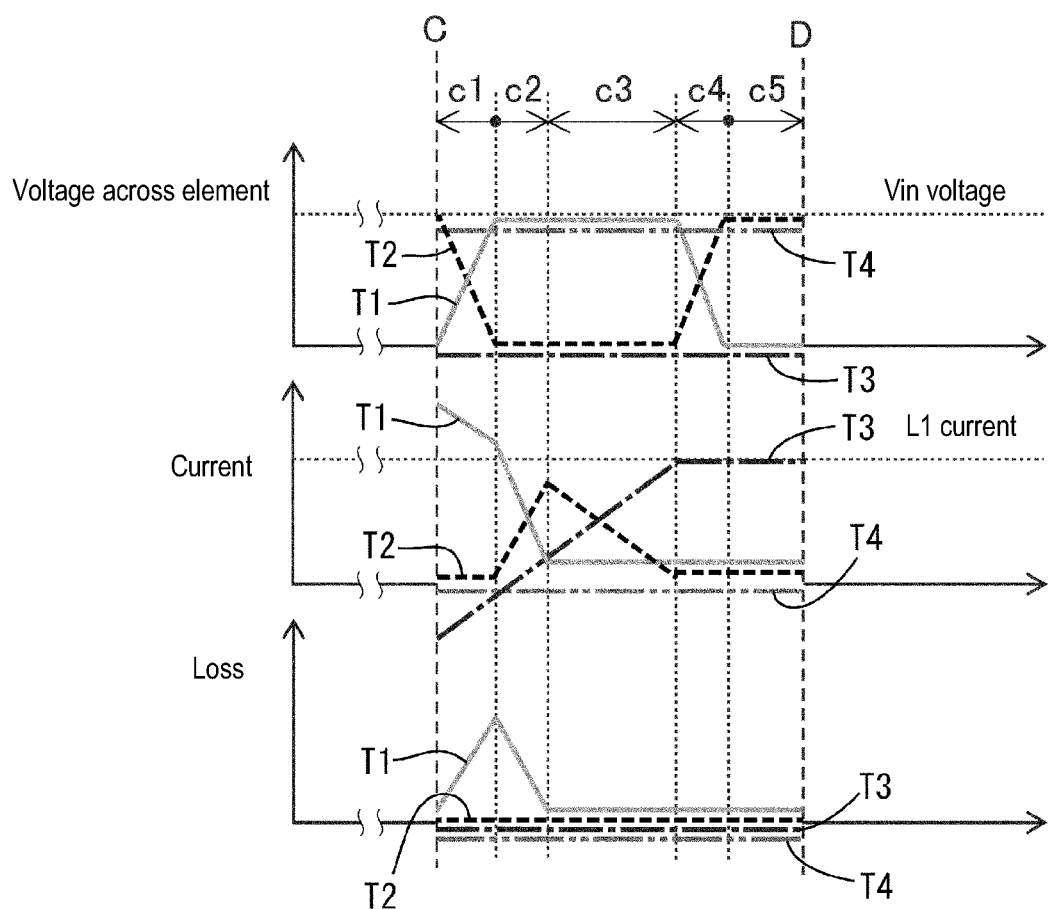
FIG. 10 is a graph illustrating, with time, a voltage between two ends of each element unit, a current flowing through the element unit, and a switching loss that occurs at the element unit during the fourth step-down control.

As shown in FIG. 10, in a time period c1 immediately after the first element unit T1 was turned off, due to the first element unit T1 being turned off at the time C, the voltage across the first element unit T1 abruptly increases, the current flowing through the second inductor L2 gradually decreases, and the current flowing through the third element unit T3 toward the first inductor L1 gradually increases. At this time, a current that corresponds to the inductor current of the first inductor L1 flows through the first element unit T1.

When, due to the operation in the time period c1, the voltage across the first element unit T1 has increased and the voltage across the second element unit T2 has decreased to about 0V, in the subsequent time period c2, a current flows through the diode (body diode) D2 of the second element unit T2. At this time, a current having a value obtained by subtracting the value (absolute value) of the current flowing through the diode D2 from the value (absolute value) of the inductor current of the second inductor L2 flows through the first element unit T1.

After the current flowing through the first element unit T1 has decreased and reached 0A in the time period c2, in the subsequent time period c3, the inductor current of the second inductor L2 (that is, the current flowing through the diode D2) decreases due to the voltage across the second inductor L2. In this time period, the current flowing through the third element unit T3 continues to increase.

When, in the time period c3, the current flowing through the diode D2 has decreased and reached about 0A, the voltage across the second element unit T2 is no longer clamped, and thus in the subsequent time period c4, the voltage across the second element unit T2 increases again to the voltage (input voltage) Vin of the first conductive path 81. On the other hand, the voltage across the first element unit T1 decreases to about 0V. In the subsequent time period c5, the voltages across the elements are maintained. Furthermore, when, in the time period c3, the current flowing through the diode D2 has decreased and no longer flows through the diode D2, then, in the subsequent time periods c4 and c5, only the current flowing through the third element unit T3 will flow through the first inductor L1, as shown in the middle portion of FIG. 10.

As shown in FIG. 10, in the time period in which the fourth step-down control is executed, a switching loss occurs in the time periods c1 and c2, which are time periods immediately after the first element unit T1 has been turned off, but a switching loss for the current that flows through the third element unit T3 can be reduced. Furthermore, it is also possible to perform the switching at a value close to the lower limit of a ripple current of the first inductor L1.

Figure 11:
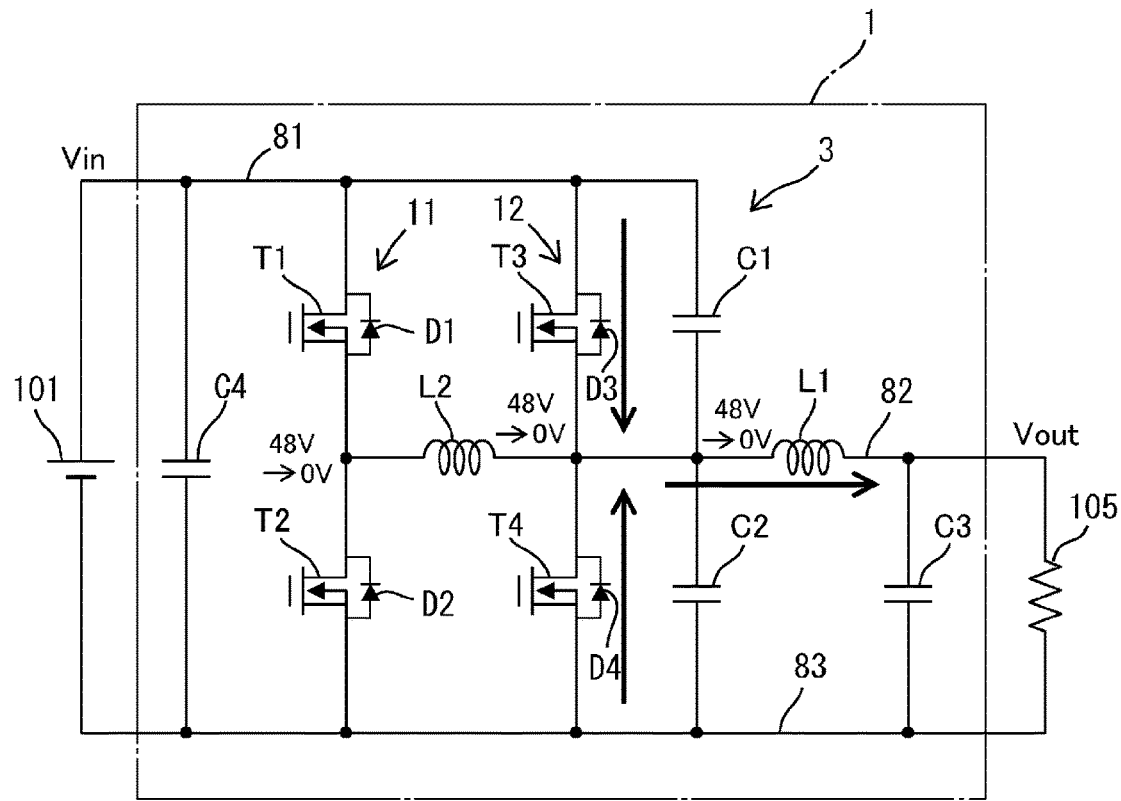
FIG. 11 is a diagram illustrating the first step-down control.

Next, an operation that is performed when the drive unit 5 switches the fourth step-down control to the first step-down control will be described with reference to FIGS. 11, 12, and so on.

The first step-down control is control that is executed after being switched to from the fourth step-down control, and in which the first element unit T1 is maintained in the OFF state, and the third element unit T3 is turned off. In the graphs of FIGS. 12 and 13, the first step-down control is executed in a time period between the time D, at which the third element unit T3 is turned off, and the time A, at which the first element unit T1 is again turned on.

Figure 12:
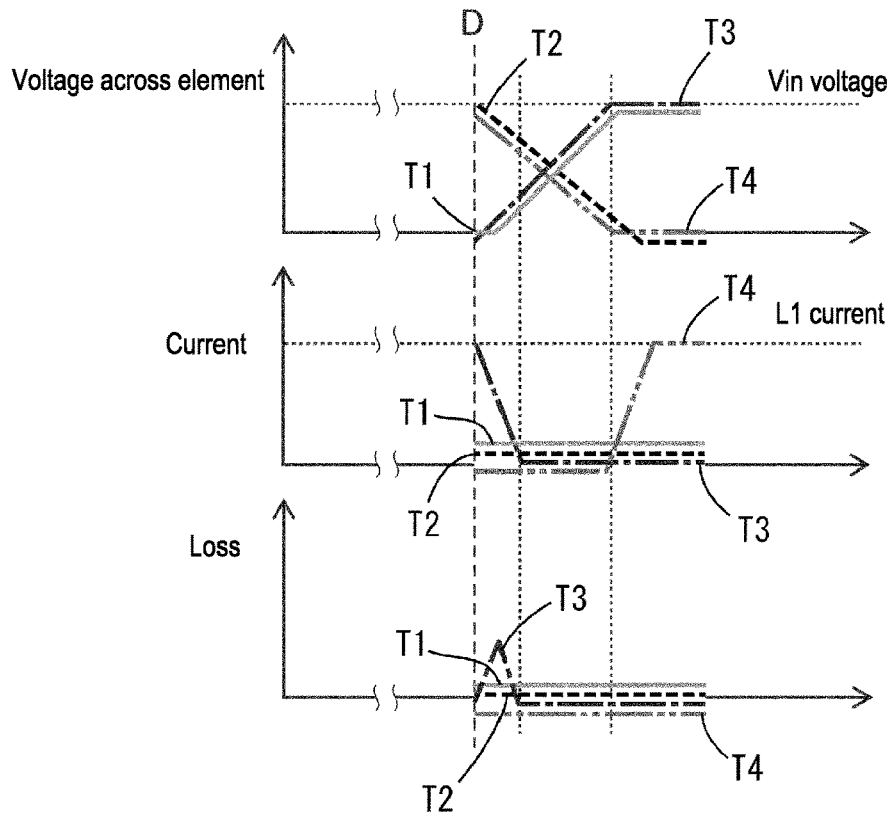
FIG. 12 is a graph illustrating, with time, a voltage between two ends of each element unit, a current flowing through the element unit, and a switching loss that occurs at the element unit during the first step-down control.

Immediately after the execution of the first step-down control, as shown in the time period c5 in the middle portion of FIG. 10, the current is flowing through the third element unit T3 toward the first inductor L1, and as shown in FIG. 12, the current flowing through the third element unit T3 abruptly decreases from the time D, at which the third element unit T3 is turned off. On the other hand, due to the presence of the first capacitor C1 and the second capacitor C2, the voltage across the third element unit T3 slowly increases after the third element unit T3 was turned off. When, after the voltage across the third element unit T3 has slowly increased in this way, the voltage across the fourth element unit T4 reaches a value close to 0V, then a current flows through the diode (body diode) D4 of the fourth element unit T4, as shown in FIG. 11.

When the first step-down control is executed, as shown in the lower portion of FIG. 12, a switching loss occurs immediately after the third element unit T3 is turned off, but the switching loss is suppressed because the voltage increase immediately after the third element unit T3 was turned off is slow. The switching loss can be further suppressed by increasing the capacity of the first capacitor C1 and the second capacitor C2.

The following will describe a step-up operation that is executed by the DC-DC converter 1.

When a predetermined condition for starting a step-up operation is met, the drive unit 5 starts a driving operation of stepping up a voltage applied to the second conductive path 82 and applying the stepped-up voltage to the first conductive path 81. There is no particular limitation to "when a predetermined condition for starting a step-up operation is met". This may be, for example, a timing at which an ignition switch is switched from off to on, or a timing at which a step-up instruction is given to the DC-DC converter 1 from an external device arranged outside of the DC-DC converter 1, for example.

Figure 14:
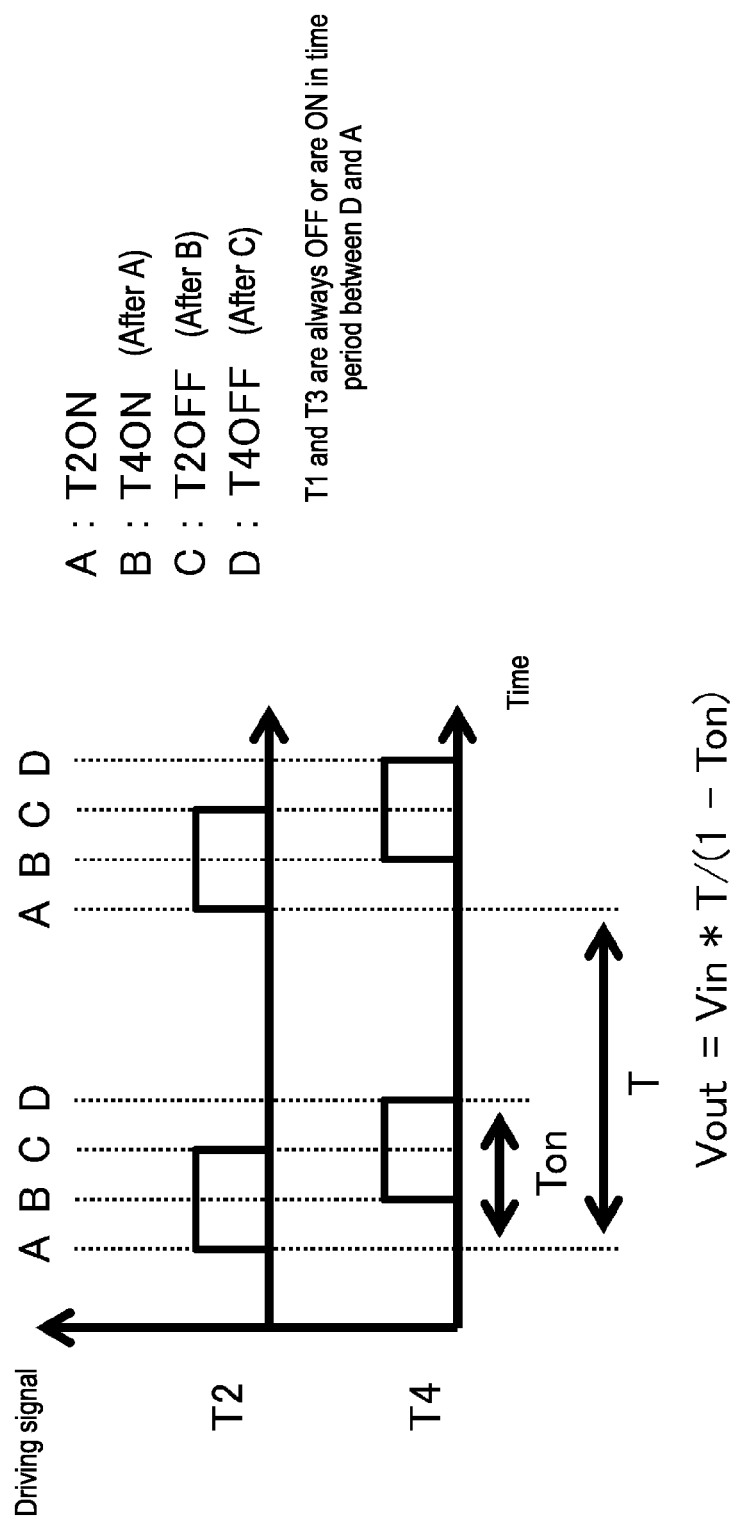
FIG. 14 is a diagram illustrating PWM signals and the like that are given to a second element unit and a fourth element unit during step-up control.

After the predetermined condition for starting a step-up operation is met, the drive unit 5 performs step-up control of alternately outputting an ON signal and an OFF signal to the gate of the second element unit T2, and alternately outputting an ON signal and an OFF signal to the gate of the fourth element unit T4, and causes the voltage conversion unit 3 to perform a step-up operation of stepping up a voltage applied to the second conductive path 82 and applying the stepped-up voltage to the first conductive path 81. Specifically, as shown in FIG. 14, the drive unit 5 outputs a PWM signal serving as a driving signal to the gate of the second element unit T2, and outputs, to the gate of the fourth element unit T4, a PWM signal serving as a driving signal with its phase shifted from that of the PWM signal output to the gate of the second element unit T2. The PWM signal that is output to the gate of the second element unit T2 by the drive unit 5 has the same duty ratio as that of the PWM signal that is output to the gate of the fourth element unit T4, and specifically the duty ratio of the PWM signals is adjusted by feedback control so that the voltage (output voltage) that is applied to the first conductive path 81 is set to a desired target voltage. As shown by the formula shown in the lower part of FIG. 14, an output voltage Vout that is applied to the first conductive path 81 is determined by an input voltage Vin that is applied to the second conductive path 82, a cycle T of the PWM signals shown in FIG. 14, and an output time period (from later-described times A to D) in which an ON signal is output to at least any of the second element unit T2 and the fourth element unit T4.

FIG. 14 is a timing chart schematically illustrating the PWM signal that is given to the gate of the second element unit T2 and the PWM signal that is given to the gate of the fourth element unit T4, when the drive unit 5 performs the step-up control. In FIG. 14, a time A is a timing at which an ON time of the PWM signal that is given to the gate of the second element unit T2 is started, a time B is a timing at which an ON time of the PWM signal that is given to the gate of the fourth element unit T4 is started, a time C is a timing at which an OFF time of the PWM signal that is given to the gate of the second element unit T2 is started, and a time D is a timing at which an OFF time of the PWM signal that is given to the gate of the fourth element unit T4 is started. As shown in FIG. 14, when performing the step-up control, the drive unit 5 performs first step-up control of outputting OFF signals to the second element unit T2 and the fourth element unit T4, and then performs second step-up control of outputting an ON signal to the second element unit T2 and maintaining the OFF signal to the fourth element unit T4. In the example of FIG. 14, a time period between the time D and the time A is a time period in which the drive unit 5 performs the first step-up control, and in this time period, both the second element unit T2 and the fourth element unit T4 are maintained in the OFF state. Also, a time period between the time A and the time B is a time period in which the drive unit 5 performs the second step-up control, and in this time period, the second element unit T2 is maintained in the ON state and the fourth element unit T4 is maintained in the OFF state.

After the above-described second step-up control, the drive unit 5 performs third step-up control of maintaining the ON signal to the second element unit T2 and outputting an ON signal to the fourth element unit T4. In the example of FIG. 14, the time period from the time B to the time C is a time period in which the drive unit 5 performs the third step-up control, and in this time period, both the second element unit T2 and the fourth element unit T4 are maintained in the ON state. Then, after the third step-up control, the drive unit 5 performs fourth step-up control of outputting an OFF signal to the second element unit T2 and maintaining the ON signal to the fourth element unit T4. In the example of FIG. 14, a time period between the time C and the time D is a time period in which the drive unit 5 performs the fourth step-up control, and in this time period, the second element unit T2 is maintained in the OFF state and the fourth element unit T4 is maintained in the ON state. Then, the drive unit 5 repeats control such that the first step-up control is performed after the fourth step-up control. In other words, the drive unit 5 performs the first step-up control, the second step-up control, the third step-up control, and the fourth step-up control in the stated order, which can be regarded as one cycle, and repeats a plurality of such cycles.

When performing the step-up control in this way, the drive unit 5 may always give OFF signals to the gates of the first element unit T1 and the third element unit T3, or may also give ON signals to the gates of the first element unit T1 and the third element unit T3 while giving OFF signals to both the second element unit T2 and the fourth element unit T4 (that is, the time period D-A between the time D and the time A).

Hereinafter, operations that are performed during the step-up control will be described in more detail. Note that the following description is given on the assumption that the forward direction voltages Vf of the body diodes D1, D2, D3, and D4 of the first element unit T1, the second element unit T2, the third element unit T3, and the fourth element unit T4 are substantially 0V (Vf≈0). Furthermore, in FIGS. 16, 18, 20, 22, and 24, the changes in voltages across the first element unit T1, the second element unit T2, the third element unit T3, and the fourth element unit T4 are indicated in the upper portion, the changes in currents flowing through the first element unit T1, the second element unit T2, the third element unit T3, and the fourth element unit T4 are indicated in the middle portion, and switching loss that may occur in the first element unit T1, the second element unit T2, the third element unit T3, and the fourth element unit T4 is shown in the lower portion. In the graphs, changes that correspond to the first element unit T1 are indicated by solid lines, changes that correspond to the second element unit T2 are indicated by dashed lines, changes that correspond to the third element unit T3 are indicated by long-short dashed lines, and changes that correspond to the fourth element unit T4 are indicated by long-short-short dashed lines. Furthermore, in the following description, it is assumed that the voltage applied to the second conductive path 82 is Vin. Note that, in the circuit diagrams such as FIGS. 15, 17, 19, 21, and 23, the drive unit 5, the first power supply unit 101, and the like are omitted. Furthermore, a load 107 that is electrically connected to the first conductive path 81 is illustrated in a simplified manner.

Figure 15:
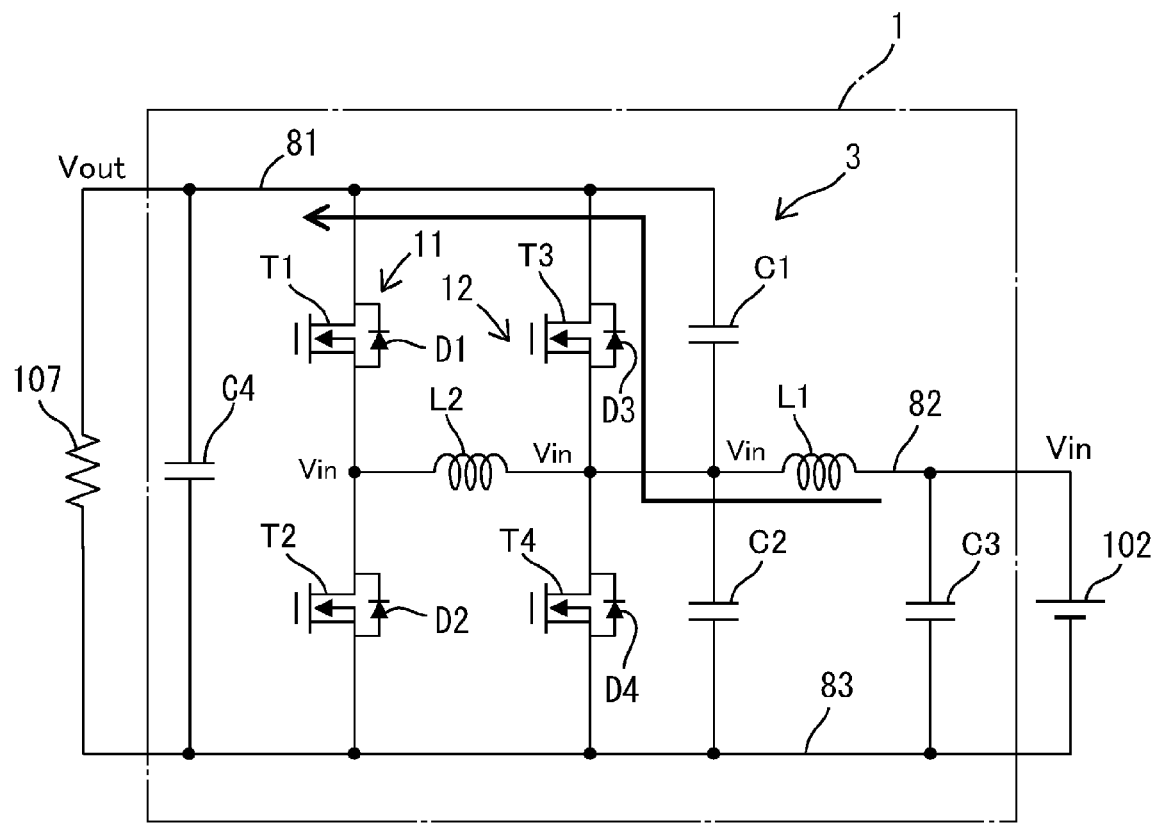
FIG. 15 is a diagram illustrating an operation that is performed before first step-up control is complete.
Figure 16:
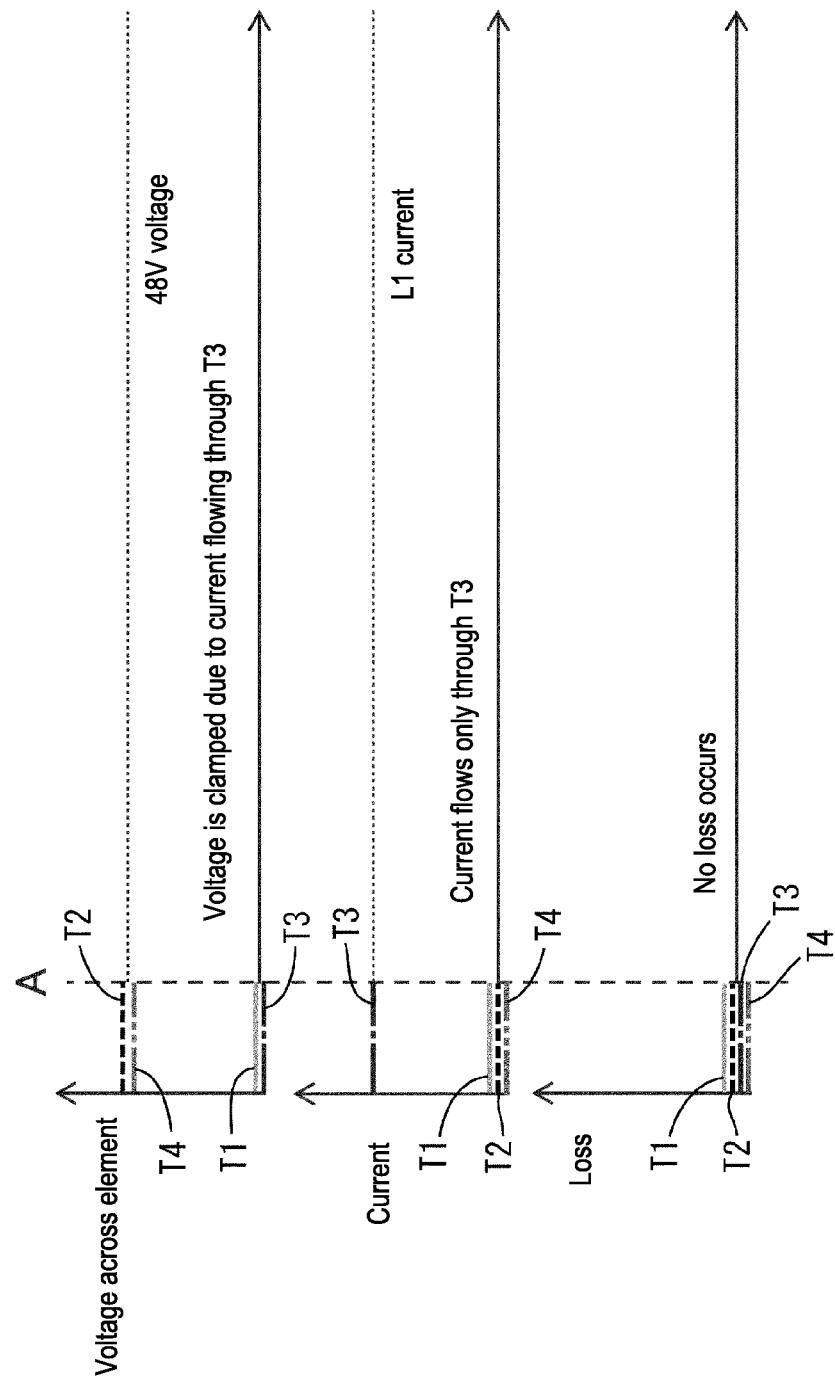
FIG. 16 is a graph illustrating, with time, a voltage between two ends of each element unit, a current flowing through the element unit, and a switching loss that occurs at the element unit before the first step-up control is complete.

First, an overview of an operation that is performed when the drive unit 5 executes the first step-up control will be described with reference to FIGS. 15, 16, and so on. Note that the first step-up control will also be described later.

The first step-up control is control that is executed after being switched to from the later-described fourth step-up control, and in which both the second element unit T2 and the fourth element unit T4 are turned off. As shown in FIG. 15, during the first step-up control, a current flows only through the diode (body diode) D3 of the third element unit T3, out of the first element unit T1, the second element unit T2, the third element unit T3, and the fourth element unit T4, the current serves as an inductor current of the first inductor L1 (see also the graph in the middle portion of FIG. 16). Furthermore, due to the current flowing through the diode D3 of the third element unit T3, the terminal voltages at the first element unit T1, the second element unit T2, the third element unit T3, and the fourth element unit T4 are clamped. As shown in the graph in the upper portion of FIG. 16, the voltages across the second element unit T2 and the fourth element unit T4 are kept at about 48V, and the voltages across the first element unit T1 and the third element unit T3 are kept at substantially 0V. Note that, while the first step-up control is maintained, no switching loss occurs at the first element unit T1, the second element unit T2, the third element unit T3, and the fourth element unit T4, as shown in the graph in the lower portion of FIG. 16.

Next, an operation that is performed when the drive unit 5 switches the first step-up control to the second step-up control will be described with reference to FIGS. 17, 18, and the like.

Figure 25:
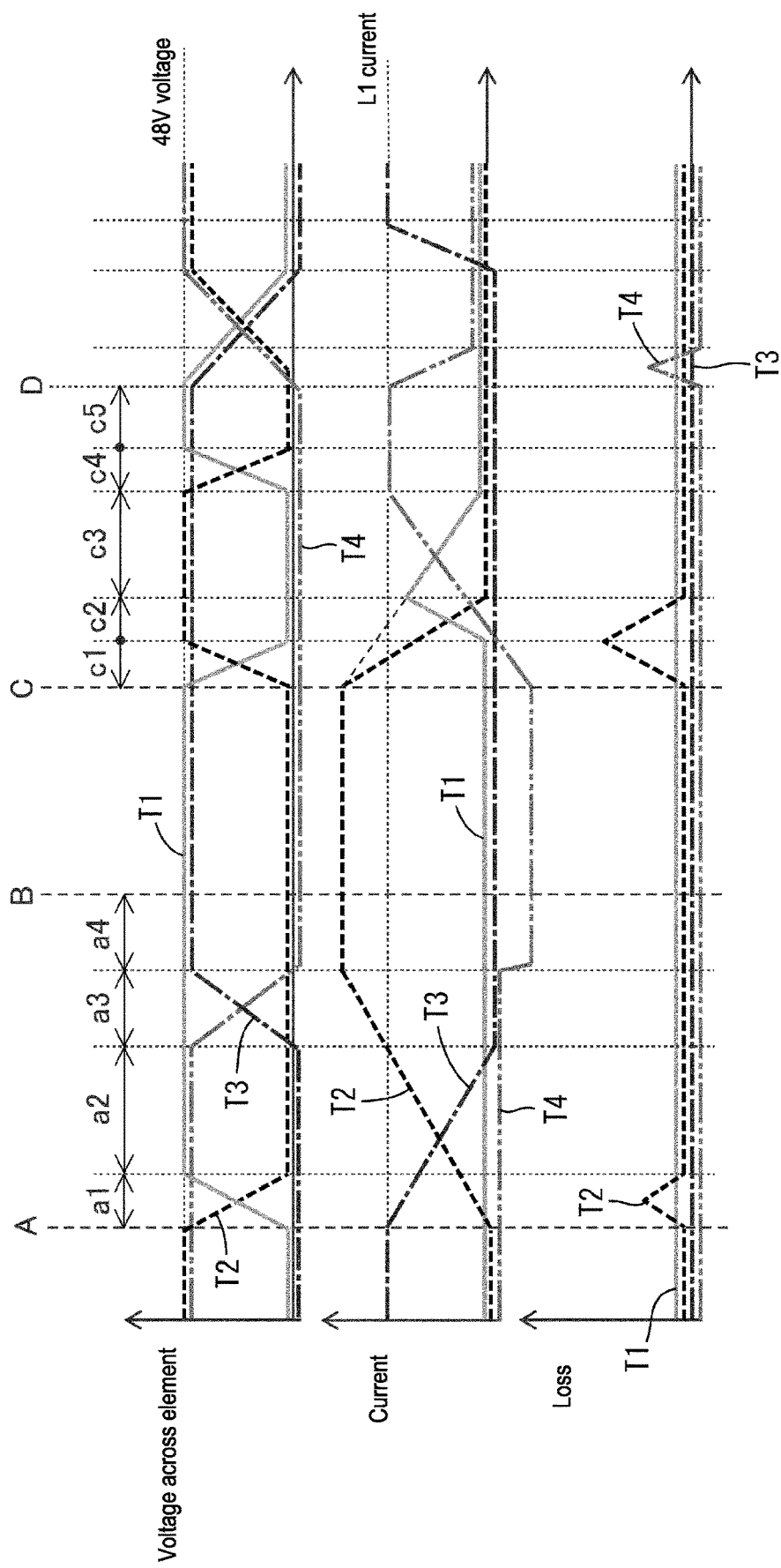
FIG. 25 is a graph illustrating, with time, a voltage between two ends of each element unit, a current flowing through the element unit, and a switching loss that occurs at the element unit during step-up control.

The second step-up control is control that is executed after being switched to from the first step-up control, and in which the second element unit T2 is turned on and the fourth element unit T4 is maintained in the OFF state. In the graphs of FIGS. 18 and 25, the second step-up control is performed in a time period between the time A, at which the second element unit T2 is turned on, and the time B, at which the fourth element unit T4 is turned on.

Figure 17:
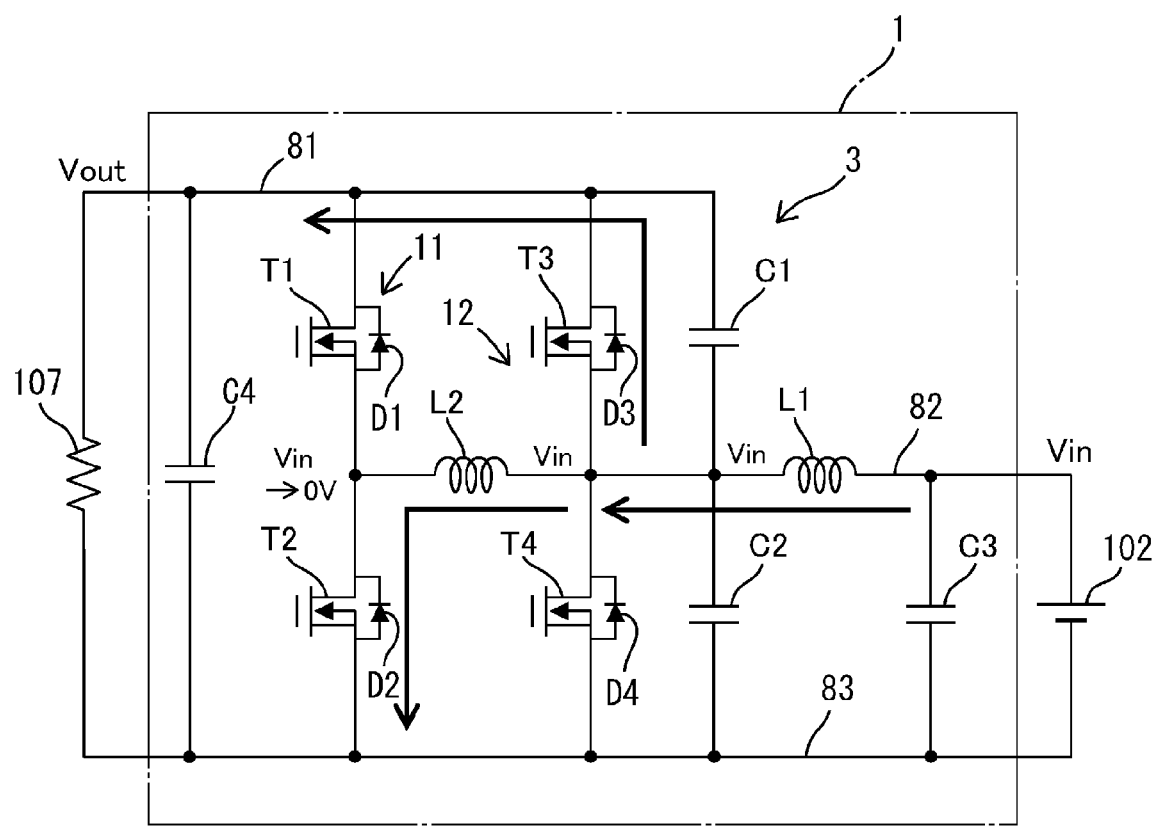
FIG. 17 is a diagram illustrating second step-up control.

Immediately after the execution of the second step-up control, as shown in FIG. 17, the current flowing through the second element unit T2 increases in accordance with the ON operation of the second element unit T2, in a state in which the current is flowing through the diode (body diode) D3 of the third element unit T3. At this time, as in a time period a1 shown in FIG. 18, due to the second element unit T2 being turned on at the time A, the voltage across the second element unit T2 abruptly decreases, and the voltage across the first element unit T1 increases in response to the decrease in the voltage across the second element unit T2 since no current flows through the first element unit T1. At this time, as shown in the graph in the middle portion of FIG. 18, the current flowing through the second element unit T2 will slowly increase due to the inductance component of the second inductor L2.

After, due to the operation in the time period a1, the voltage across the second element unit T2 has decreased to a value close to 0V, in the subsequent time period a2, the current flowing through the second element unit T2 gradually increases and reaches the value of a current flowing through the first inductor L1. On the other hand, the current flowing through the diode D3 of the third element unit T3 gradually decreases until it reaches 0A.

In a time period a3 after the current flowing through the second element unit T2 has reached the value of the current flowing through the first inductor L1 and the current flowing through the diode D3 of the third element unit T3 has reached 0A, the value of the current flowing through the second element unit T2 further increases due to the presence of the second inductor L2. At this time, a surplus current obtained when the current flowing through the second element unit T2 has exceeded the value of the current flowing through the first inductor L1 is absorbed and adjusted through discharge and charge of the first capacitor C1 and the second capacitor C2 (discharge of the second capacitor C2, and charge of the second capacitor C1). As a result of this adjustment, the voltage across the third element unit T3 increases, and the voltage across the fourth element unit T4 decreases to about 0V.

In this manner, in a time period a4 after the voltage across the fourth element unit T4 has decreased to about 0V, the diode D4 (body diode) of the fourth element unit T4 becomes conductive, and the portion of the current flowing through the second element unit T2 that exceeds the inductor current of the first inductor L1 can flow through the diode D4 (body diode) of the fourth element unit T4.

Figure 18:
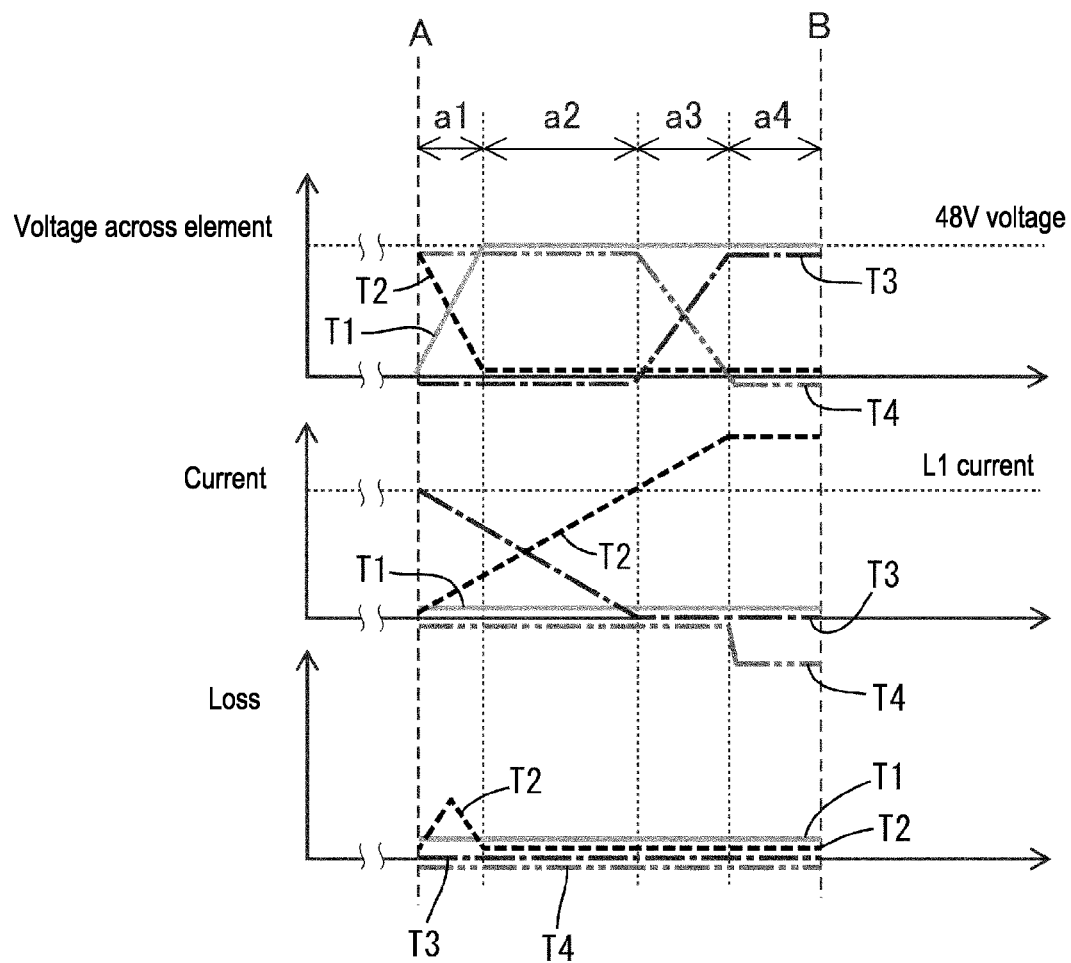
FIG. 18 is a graph illustrating, with time, a voltage between two ends of each element unit, a current flowing through the element unit, and a switching loss that occurs at the element unit during the second step-up control.

As shown in FIG. 18, in the time period in which the second step-up control is performed, a switching loss occurs immediately after the second element unit T2 is turned on, but the switching loss can be reduced since a current of the second element unit T2 is suppressed by the inductance component of the second inductor L2. Furthermore, the switching loss can further be reduced by increasing the inductance of the second inductor L2.

Next, an operation that is performed when the drive unit 5 switches the second step-up control to the third step-up control will be described with reference to FIGS. 19, 20, and so on.

The third step-up control is control that is executed after being switched to from the second step-up control, and in which the second element unit T2 is maintained in the ON state, and the fourth element unit T4 is turned on. In the graphs of FIGS. 20 and 25, the third step-up control is performed in a time period between the time B, at which the fourth element unit T4 is turned on, and the time C, at which the second element unit T2 is turned off.

Figure 19:
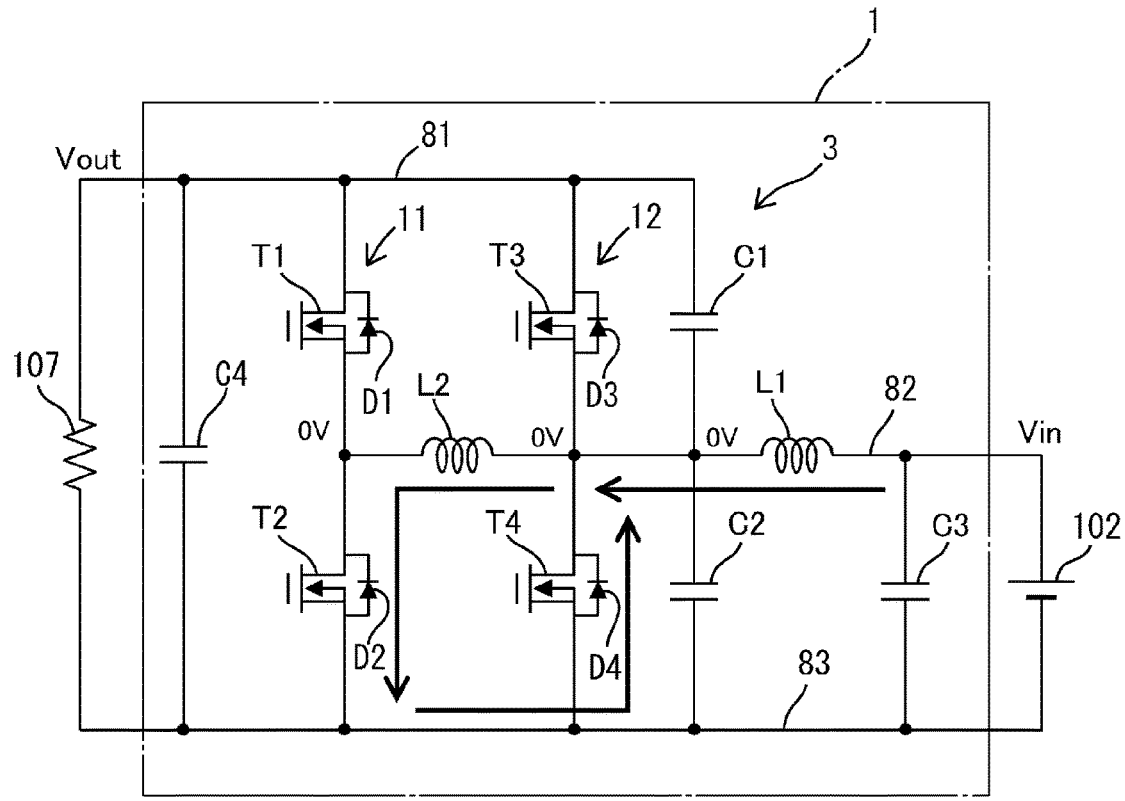
FIG. 19 is a diagram illustrating third step-up control.

Immediately after the execution of the third step-up control, as shown in FIG. 19, a state is maintained in which a current from the second inductor L2 flows through the second element unit T2, and a current flows through the diode (body diode) D4 of the fourth element unit T4. Then, in the time period in which the third step-up control is executed, voltages at both ends of the second inductor L2 are equal to each other and seek to maintain the current, and thus the current value does not change as shown in the middle portion of FIG. 20.

Figure 20:
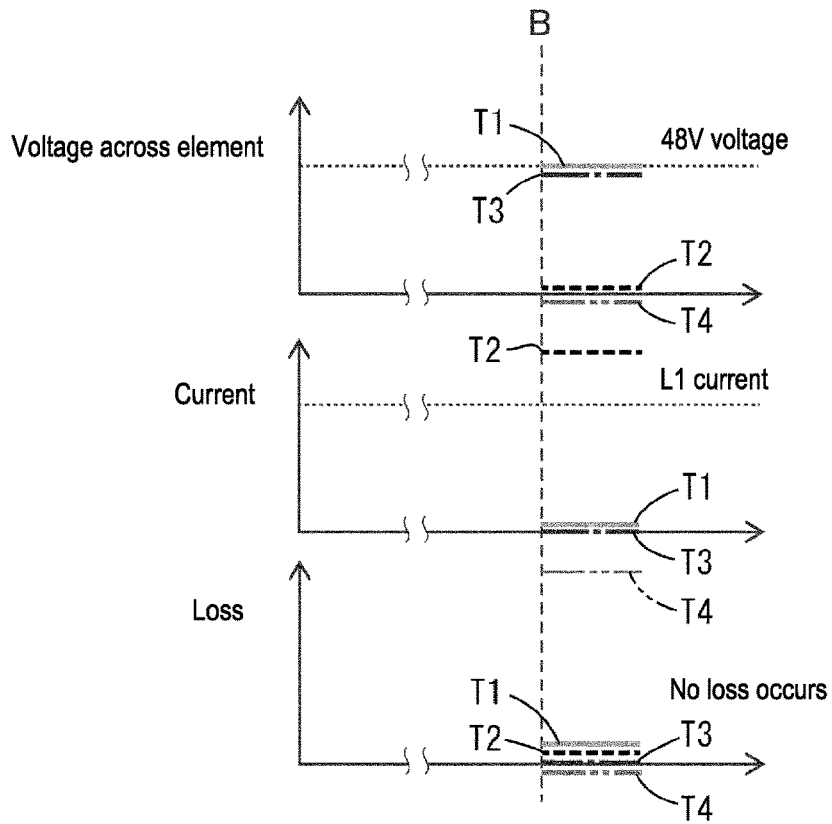
FIG. 20 is a graph illustrating, with time, a voltage between two ends of each element unit, a current flowing through the element unit, and a switching loss that occurs at the element unit during the third step-up control.

As shown in FIGS. 18 and 20, at the time B (at which the second step-up control is switched to the third step-up control), the voltage across the fourth element unit T4 is about 0V, and thus even if the fourth element unit T4 is turned on at the time B, the voltage hardly changes. Since the voltage across the fourth element unit T4 about 0V before and after it is turned on from off (that is, before and after the time B), no switching loss occurs as in the graph in the lower portion of FIG. 20.

Figure 21:
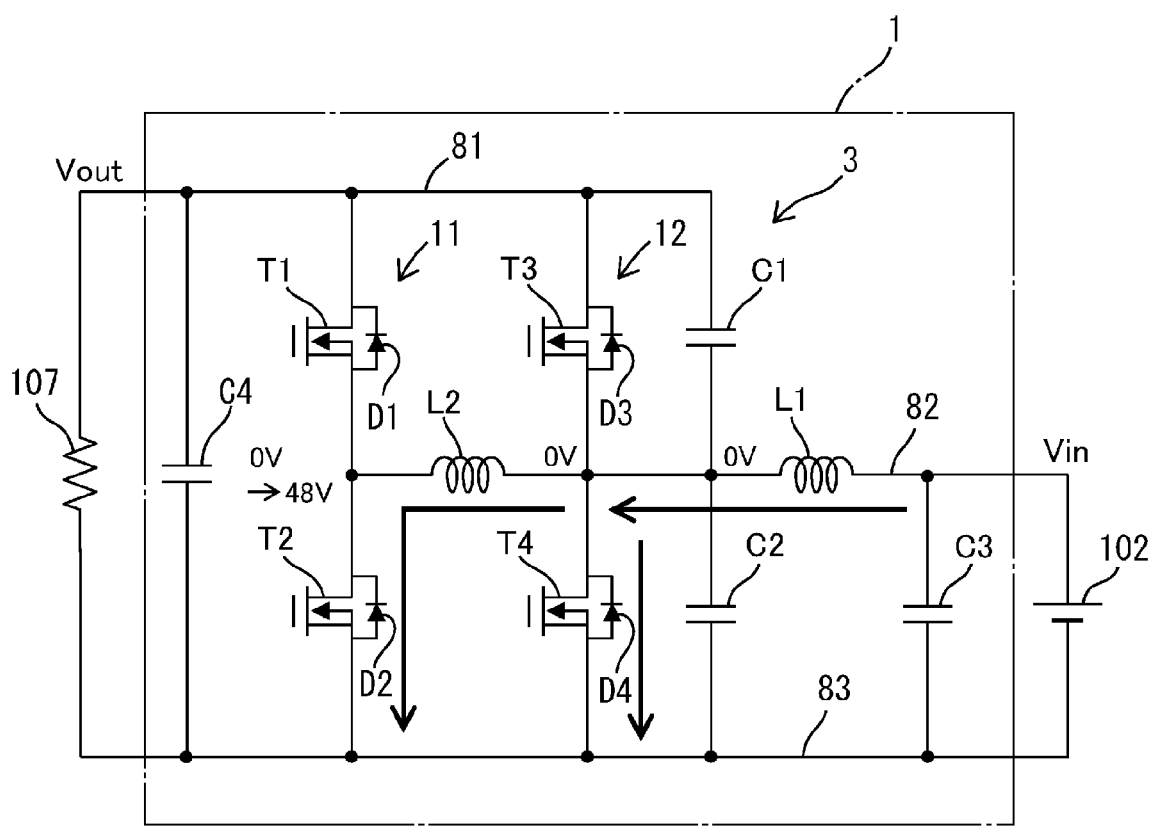
FIG. 21 is a diagram illustrating fourth step-up control.

Next, an operation that is performed when the drive unit 5 switches the third step-up control to the fourth step-up control will be described with reference to FIGS. 21, 22, and the like.

The fourth step-up control is control that is executed after being switched to from the third step-up control, and in which the fourth element unit T4 is maintained in the ON state, and the element unit T2 is turned off. In the graphs of FIGS. 22 and 25, the fourth step-up control is performed in a time period between the time C, at which the second element unit T2 is turned off, and the time D, at which the fourth element unit T4 is turned off.

Immediately before the execution of the fourth step-up control, due to the third step-up control, a current was flowing through the second element unit T2 and a current was flowing through the diode (body diode) D4 of the fourth element unit T4 (see FIG. 20), and in this state, the fourth step-up control is started so that the second element unit T2 is turned off.

Figure 22:
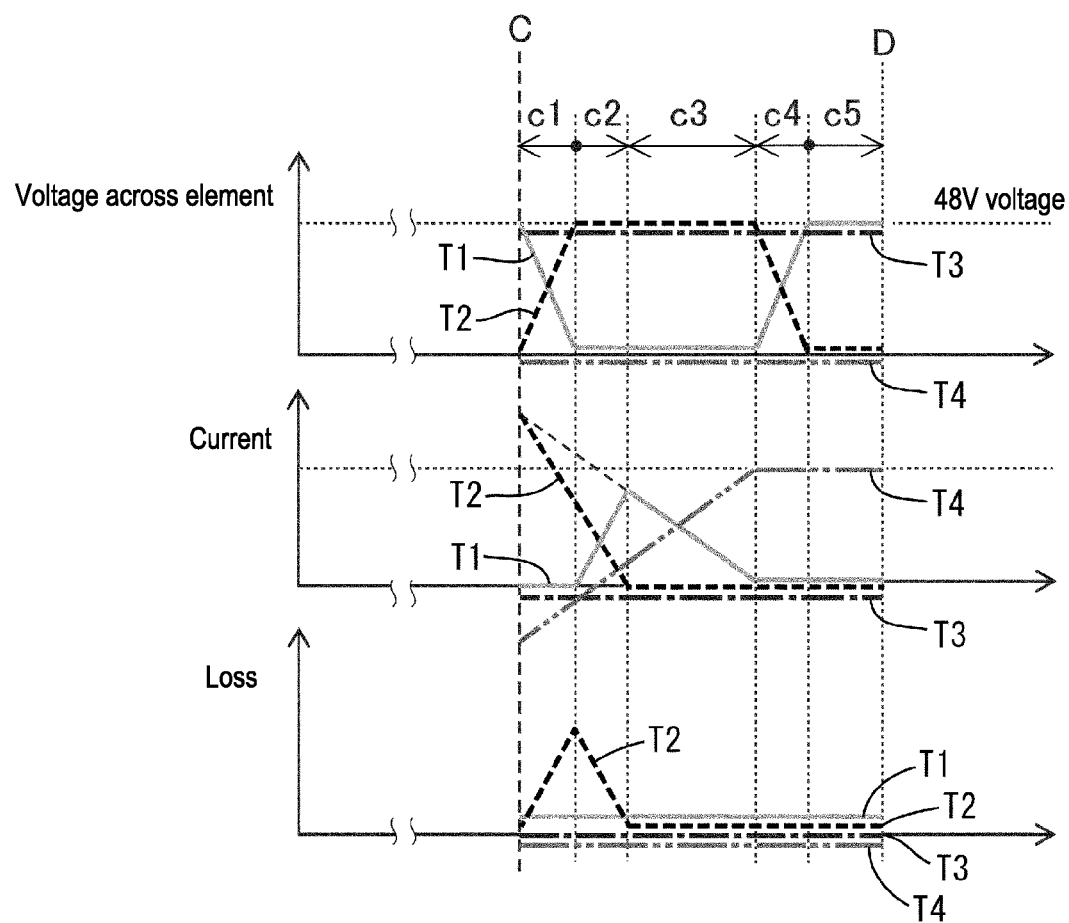
FIG. 22 is a graph illustrating, with time, a voltage between two ends of each element unit, a current flowing through the element unit, and a switching loss that occurs at the element unit during the fourth step-up control.

As shown in FIG. 22, in a time period c1 immediately after the second element unit T2 was turned off, due to the second element unit T2 being turned off at the time C, the voltage across the second element unit T2 abruptly increases, the current flowing through the second inductor L2 gradually decreases, and the current flowing from the first inductor L1 toward the fourth element unit T4 gradually increases.

When, due to the operation in the time period c1, the voltage across the second element unit T2 has increased and the voltage across the first element unit T1 has decreased to about 0V, in the subsequent time period c2, a current flows through the diode (body diode) D1 of the first element unit T1.

After the current flowing through the second element unit T2 has decreased and reached 0A in the time period c2, in the subsequent time period c3, the inductor current of the second inductor L2 (that is, the current flowing through the diode D1) decreases due to the voltage across the second inductor L2. In this time period, the current flowing through the fourth element unit T4 continues to increase.

When, in the time period c3, the current flowing through the diode D1 has decreased and reached about 0A, the voltage across the first element unit T1 is no longer clamped, and thus in the subsequent time period c4, the voltage across the first element unit T1 increases again to the input voltage Vin. On the other hand, the voltage across the second element unit T2 decreases to about 0V. In the subsequent time period c5, the voltages across the elements are maintained. Furthermore, when, in the time period c3, the current flowing through the diode D1 has decreased and no longer flows through the diode D1, then, in the subsequent time periods c4 and c5, all of currents flowing through the first inductor L1 flow through the fourth element unit T4, as shown in the middle portion of FIG. 22.

As shown in FIG. 22, in the time period in which the fourth step-up control is executed, a switching loss occurs in the time periods c1 and c2, which are time periods immediately after the second element unit T2 has been turned off, but the switching loss for the current that flows through the first element unit T1 can be reduced.

Figure 23:
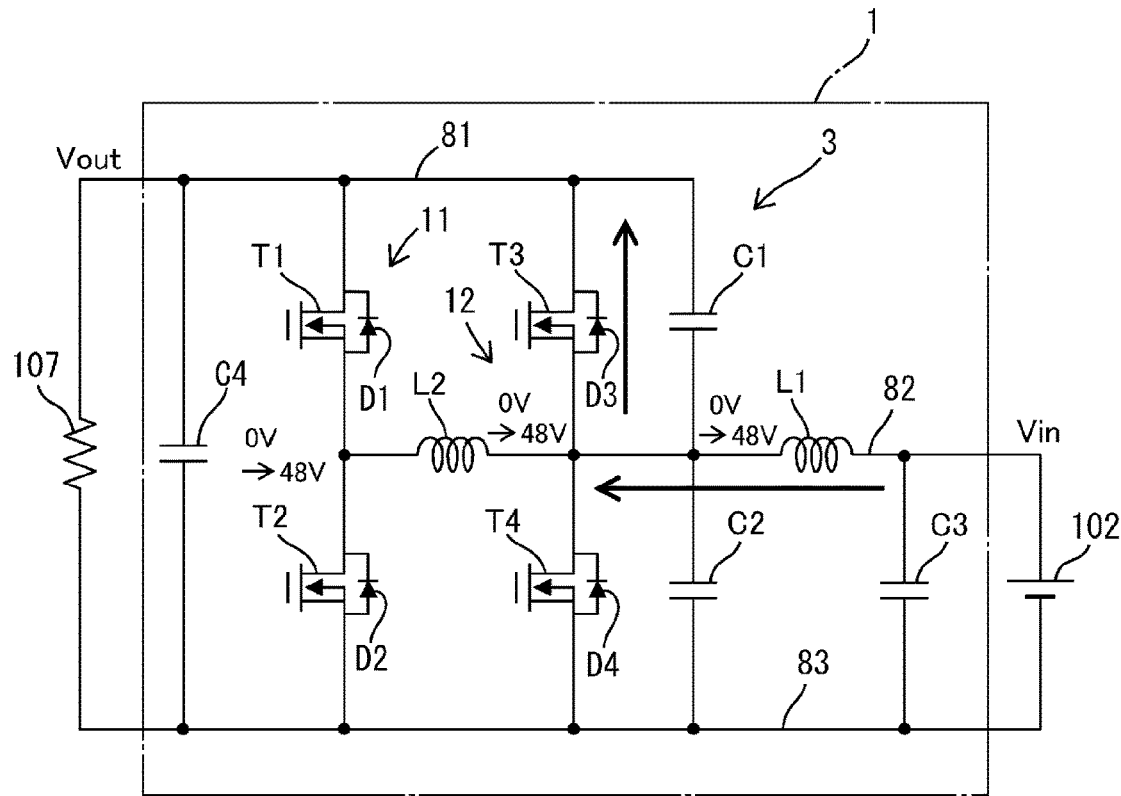
FIG. 23 is a diagram illustrating the first step-up control.

Next, an operation that is performed when the drive unit 5 switches the fourth step-up control to the first step-up control will be described with reference to FIGS. 23, 24, and so on.

The first step-up control is control that is executed after being switched to from the fourth step-up control, and in which the second element unit T2 is maintained in the OFF state, and the fourth element unit T4 is turned off. In the graphs of FIGS. 24 and 25, the first step-up control is executed in a time period between the time D, at which the fourth element unit T4 is turned off, and the time A, at which the second element unit T2 is again turned on.

Figure 24:
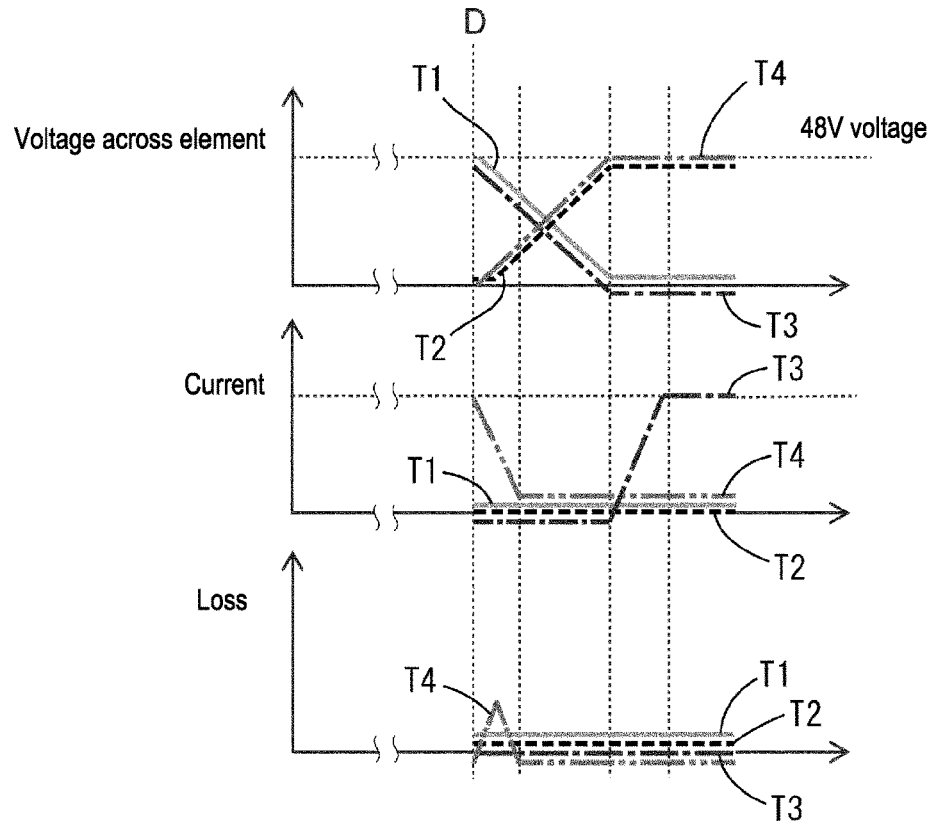
FIG. 24 is a graph illustrating, with time, a voltage between two ends of each element unit, a current flowing through the element unit, and a switching loss that occurs at the element unit during the first step-up control.

Immediately after the execution of the first step-up control, as shown in the time period c5 in the middle portion of FIG. 22, the current is flowing through the fourth element unit T4, and as shown in FIG. 24, the current flowing through the fourth element unit T4 abruptly decreases from the time D, at which the fourth element unit T4 is turned off. On the other hand, due to the presence of the first capacitor C1 and the second capacitor C2, the voltage across the fourth element unit T4 slowly increases after the fourth element unit T4 was turned off. When, after the voltage across the fourth element unit T4 has slowly increased in this way, the voltage across the third element unit T3 reaches a value close to 0V, then a current flows through the diode (body diode) D3 of the third element unit T3, as shown in FIG. 23.

When the first step-up control is executed, as shown in the lower portion of FIG. 24, a switching loss occurs immediately after the fourth element unit T4 is turned off, but the switching loss is suppressed because the voltage increase immediately after the fourth element unit T4 was turned off is slow. The switching loss can be further suppressed by increasing the capacity of the first capacitor C1 and the second capacitor C2.

The following will describe examples of effects of the DC-DC converter 1 with this configuration.

In the DC-DC converter 1, when performing the step-down control, the drive unit 5 alternately repeats control of turning off the high-side switching elements (the first element unit T1 and the third element unit T3) of the first switching circuit 11 and the second switching circuit 12, and control of turning on the high-side switching elements. Also, during an ON time period of at least the high-side first element unit T1 or third element unit T3, an inductor current that flows through the first inductor L1 is generated in a state in which, in the low-side elements (the second element unit T2 and the fourth element unit T4), a current flow to the reference conductive path 83 side is interrupted and a current is allowed to flow from the reference conductive path 83 side, and during an OFF time period of the high-side first element unit T1 and third element unit, a current is allowed to flow toward the first inductor L1 via the low-side elements, so that it is possible to step down a voltage applied to the first conductive path 81 and output the stepped-down voltage to the second conductive path 82.

Furthermore, when controlling on/off of the high-side switching elements (the first element unit T1 and the third element unit T3) to perform the step-down operation, the drive unit 5 performs, after the first step-down control of outputting OFF signals to the first element unit T1 and the third element unit T3, the second step-down control of outputting an ON signal to the first element unit T1 and maintaining the OFF signal to the third element unit T3. In this control, when the first element unit T1 is turned on in response to the shift from the first step-down control to the second step-down control, the current flowing through the first element unit T1 will slowly increases due to an inductance component of the second inductor L2. Accordingly, it is possible to reliably suppress a switching loss that occurs when the first element unit T1 is turned on.

Furthermore, the drive unit 5 performs, after the second step-down control, the third step-down control of maintaining the ON signal to the first element unit T1 and outputting an ON signal to the third element unit T3. In other words, the first element unit T1 is turned on, and then the third element unit T3 can be turned on with a delay, and thus it is possible that the third element unit T3 is turned on after a current flowing thereinto via the first element unit T1 and the second inductor L2 has increased to some extent and the voltage across the third element unit T3 has been reduced. Accordingly, it is also possible to reliably suppress a switching loss that occurs when the third element unit T3 is turned on.

Furthermore, the drive unit 5 performs, after the third step-down control, the fourth step-down control of outputting an OFF signal to the first element unit T1 and maintaining the ON signal to the third element unit T3. In this way, when both the first element unit T1 and the third element unit T3 are ON, the first element unit T1 can be turned off while the third element unit T3 is maintained in the ON state, and thus the first element unit T1 can be turned off in a state in which a current is partially flowing through the third element unit T3. Accordingly, it is possible to reliably suppress a switching loss that occurs when the first element unit T1 is turned off, for at least a current that flows through the third element unit T3.

Furthermore, in the DC-DC converter 1, when performing the step-up control, the drive unit 5 alternately repeats control of turning off the low-side switching elements (the second element unit T2 and the fourth element unit T4) of the first switching circuit 11 and the second switching circuit 12, and control of turning on the low-side switching elements. Also, during an ON time period of at least the low-side second element unit T2 or fourth element unit T4, an inductor current that flows through the first inductor L1 is generated in a state in which, in the high-side elements (the first element unit T1 and the third element unit T3), a current flow from the first conductive path 81 side is interrupted and a current is allowed to flow toward the first conductive path 81, and during an OFF time period of the low-side second element unit T2 and fourth element unit T4, the current that flows through the first inductor L1 is allowed to flow into the first conductive path 81 via the high-side elements, so that it is possible to step up a voltage applied to the second conductive path 82 and output the stepped-up voltage to the first conductive path 81.

Furthermore, when controlling on/off of the low-side switching elements (the second element unit T2 and the fourth element unit T4) to perform the step-up operation, the drive unit 5 performs, after the first step-up control of outputting OFF signals to the second element unit T2 and the fourth element unit T4, the second step-up control of outputting an ON signal to the second element unit T2 and maintaining the OFF signal to the fourth element unit T4. In this control, when the second element unit T2 is turned on in response to the shift from the first step-up control to the second step-up control, the current flowing through the second element unit T2 will slowly increases due to an inductance component of the second inductor L2. Accordingly, it is possible to reliably suppress a switching loss that occurs when the second element unit T2 is turned on.

Furthermore, the drive unit 5 performs, after the second step-up control, the third step-up control of maintaining the ON signal to the second element unit T2 and outputting the ON signal to the fourth element unit T4. In other words, the second element unit T2 is turned on, and then the fourth element unit T4 is turned on with a delay. With this operation, it is also possible to reliably suppress a switching loss that occurs when the fourth element unit T4 is turned on.

Furthermore, the DC-DC converter 1 is provided with the first capacitor C1 that has one electrode electrically connected to the first conductive path 81 and the other electrode electrically connected to a connection node that connects the third element unit and the first inductor L1, the first capacitor C1 being arranged in parallel with the third element unit T3. As a result of the first capacitor C1 is provided in parallel with the third element unit T3 in this way, when the third element unit T3 is turned off at the time of the shift from the fourth step-down control to the first step-down control, the voltage across the third element unit T3 slowly increases compared to a case where no such first capacitor C1 is provided. Accordingly, it is also possible to reliably suppress a switching loss that occurs when the third element unit T3 is turned off.

Furthermore, the DC-DC converter 1 is provided with the second capacitor C2 that has one electrode electrically connected to a connection node that connects the fourth element unit T4 and the first inductor L1, and the other electrode electrically connected to the reference conductive path 83, the second capacitor C2 being arranged in parallel with the fourth element unit T4. As a result of the second capacitor C2 is provided in parallel with the fourth element unit T4 in this way, when the fourth element unit T4 is turned off at the time of the shift from the fourth step-up control to the first step-up control, the voltage across the fourth element unit T4 slowly increases compared to a case where no such second capacitor C2 is provided. Accordingly, it is also possible to reliably suppress a switching loss that occurs when the fourth element unit T4 is turned off.

Furthermore, the DC-DC converter 1 has a configuration in which the inductance of the second inductor L2 is smaller than the inductance of the first inductor L1. With this, it is possible to realize a configuration that can reduce a switching loss while relatively suppressing the size of the second inductor L2.

Figure 26:
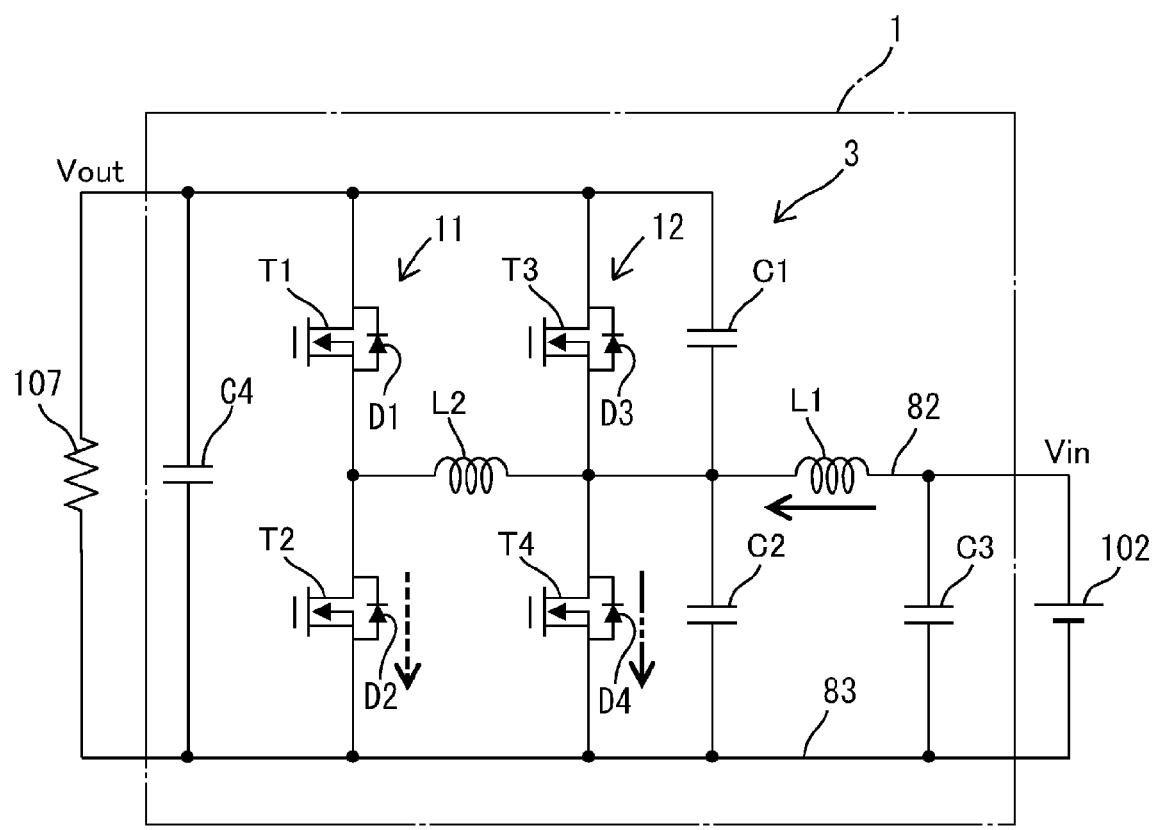
FIG. 26 is a diagram schematically illustrating the flow of a current in an ON operation period during the step-up control.
Figure 27:
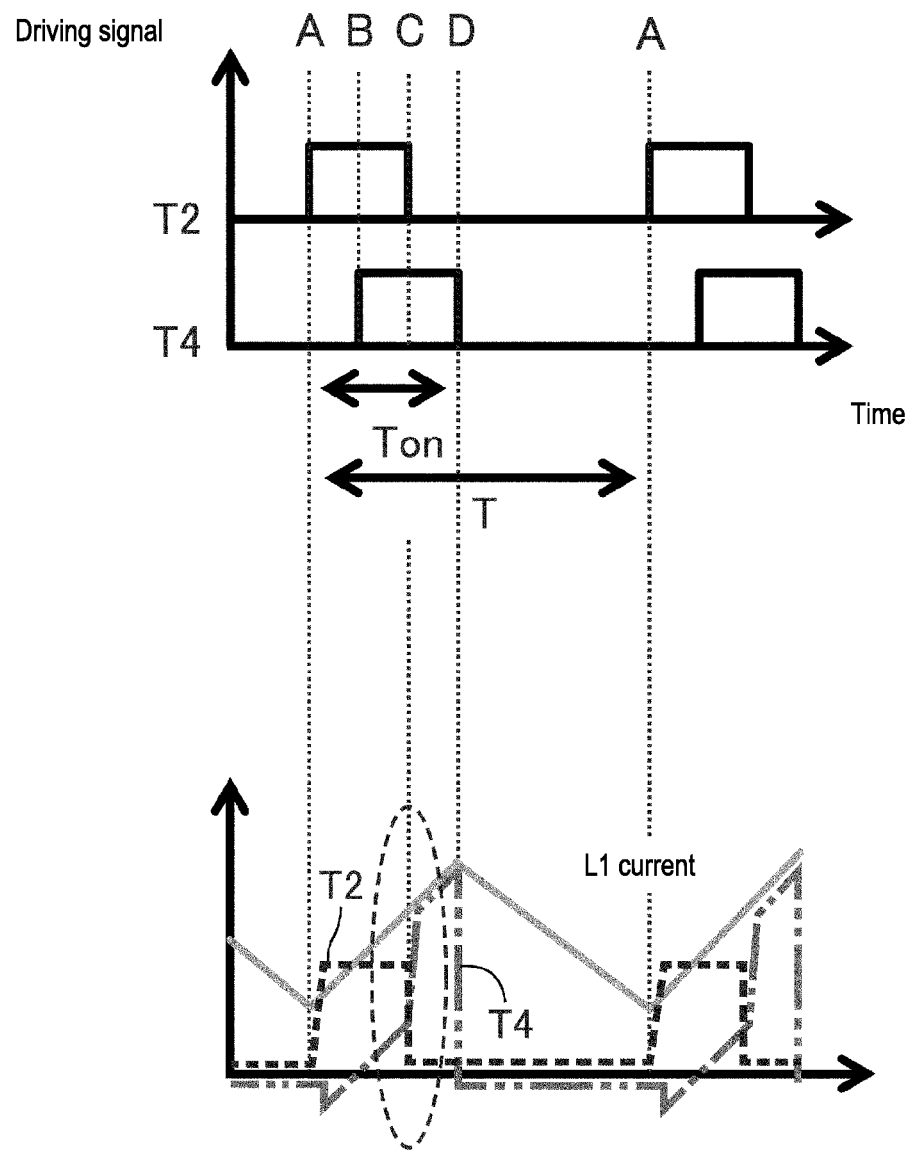
FIG. 27 is a diagram illustrating the relationship between an inductor current, and currents flowing through the second element unit and the fourth element unit, during the step-up control.

Furthermore, in the present configuration, in the step-up control, it is possible to reduce the current value when the second element unit T2 is switched from on to off, thus making it possible to further reduce a switching loss that occurs at this time. For example, when, in the time period Ton shown in FIG. 27, currents are caused to flow through the second element unit T2 and the fourth element unit T4 as shown in FIG. 26, the inductor current of the first inductor L1 indicates a value that is close to the lower limit of a ripple current at the moment of turning-on of the second element unit T2, as shown in FIG. 27. If, after the second element unit T2 has been turned on, the voltages at both ends of the second inductor L2 are equal to each other, then the second inductor L2 seeks to cause a constant current to flow, and thus the current flowing through the second element unit T2 becomes constant at a value close to the lower limit of a ripple current. At this time, the ripple current will flow through the fourth element unit T4 (see FIG. 26). Since such an operation is possible, it is possible to reduce the current value immediately after the second element unit T2 is turned off, and further reduce a switching loss that is caused at the time of the OFF operation.

Other Embodiments

The present disclosure is not limited to the embodiments described with reference to the description above and the drawings, and the technical scope of the present disclosure encompasses, for example, the following embodiments. Furthermore, the above-described embodiment and later-described embodiments may be combined with each other unless they contradict each other.

If the DC-DC converter 1 of FIG. 1 is configured to perform only a step-down operation, the second element unit T2 and the fourth element unit T4 may also be configured as diodes (specifically, diodes whose anodes are electrically connected to the reference conductive path and whose cathodes are electrically connected to the second inductor L2).

If the DC-DC converter 1 of FIG. 1 is configured to perform only a step-up operation, the first element unit T1 and the third element unit T3 may also be configured as diodes (specifically, diodes whose cathodes are electrically connected to the first conductive path, and whose anodes are electrically connected to the second inductor L2).

Figure 28:
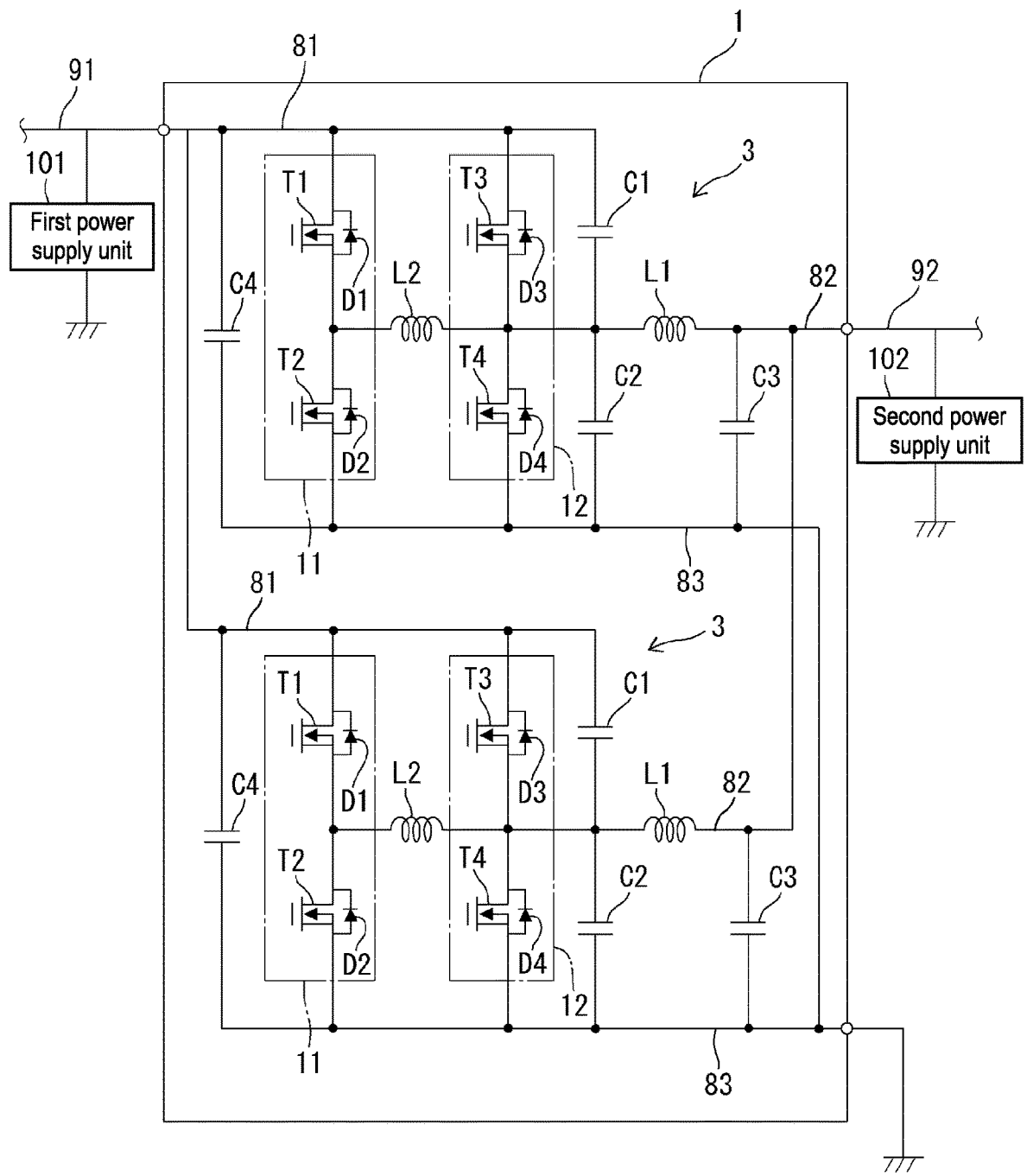
FIG. 28 is a circuit diagram schematically illustrating a biphasic step-up/down DC-DC converter as an example when the DC-DC converter according to the present disclosure is configured as a multiphase converter.

In Embodiment 1, an uniphase DC-DC converter 1 is taken as an example, but a multiphase DC-DC converter 1 as shown in FIG. 28 may also be employed. In FIG. 28, each phase has a voltage conversion unit 3 that has the same configuration as that of Embodiment 1. The DC-DC converter 1 of FIG. 28 includes a plurality of voltage conversion units 3 each of which is provided with the first switching circuit 11, the second switching circuit 12, the first inductor L1, and the second inductor L2, each voltage conversion unit 3 being arranged in parallel between the first conductive path 81 and the second conductive path 82, and being electrically connected to the reference conductive path 83. Note that the same drive unit 5 as that in Embodiment 1 is provided, although not shown in FIG. 28, and with this drive unit, the voltage conversion units 3 are controlled in the same manner as that of Embodiment 1. According to this configuration, it is possible to realize a multiphase DC-DC converter 1 that can suppress a switching loss, with a simpler configuration and a lower withstand voltage. Note that, in FIG. 28, a biphasic DC-DC converter 1 is taken as an example, a multiphase DC-DC converter with three or more phases may also be employed.

The invention claimed is:

1. A DC-DC converter comprising:
a first switching circuit that includes a first element unit having a switching element electrically connected to a first conductive path, and a second element unit having a diode that is disposed between the first element unit and a reference conductive path, the diode's anode being electrically connected to the reference conductive path side, the diode's cathode being electrically connected to the first element unit side, the reference conductive path being kept at a potential lower than a potential of the first conductive path, the first element unit and the second element unit being provided in series between the first conductive path and the reference conductive path;
a second switching circuit that includes a third element unit having a switching element electrically connected to the first conductive path, and a fourth element unit having a diode that is disposed between the third element unit and the reference conductive path, the diode's anode being electrically connected to the reference conductive path side, the diode's cathode being electrically connected to the third element unit side, the third element unit and the fourth element unit being provided in series between the first conductive path and the reference conductive path, and being arranged in parallel with the first switching circuit;

a first inductor that has one end electrically connected to a connection node that connects the third element unit and the fourth element unit, and another end electrically connected to a second conductive path;

a second inductor that has one end electrically connected to a connection node that connects the first element unit and the second element unit, and another end electrically connected to the connection node that connects the third element unit and the fourth element unit;

a drive unit configured to perform at least step-down control of alternately outputting an ON signal and an OFF signal to the first element unit, and alternately outputting an ON signal and an OFF signal to the third element unit, and step-up control of alternately outputting an ON signal and an OFF signal to the second element unit, and alternately outputting an ON signal and an OFF signal to the fourth element unit; and a first capacitor that has one electrode electrically connected to the first conductive path, and another electrode electrically connected to a connection node that connects the third element unit and the first inductor, the first capacitor being arranged in parallel with the third element unit;

a plurality of voltage conversion units are provided, each voltage conversion unit being provided with the first switching circuit, the second switching circuit, the first inductor, and the second inductor, and each voltage conversion unit is provided in parallel between the first conductive path and the second conductive path, and is electrically connected to the reference conductive path, wherein the first element unit includes a diode whose cathode is electrically connected to the first conductive path side, the diode's anode being electrically connected to the second element unit side, the second element unit includes a switching element disposed between the anode of the diode of the first element unit and the reference conductive path, the third element unit includes a diode whose cathode is electrically connected to the first conductive path side, the diode's anode being electrically connected to the fourth element unit side, and the fourth element unit includes a switching element disposed between the anode of the diode of the third element unit and the reference conductive path, and wherein, in the first element unit and the third element unit, a current is allowed to flow to the first conductive path side, and during an ON time period of at least the second element unit or the fourth element unit, a current flow from the first conductive path side is interrupted, and in the second element unit and the fourth element unit, a current is allowed to flow from the reference conductive path side, and during an ON time period of at least the first element unit or the third element unit, a current flow toward the reference conductive path side is interrupted, and wherein the drive unit repeats control such that after first step-down control of outputting OFF signals to the first element unit and the third element unit, second step-down control of outputting an ON signal to the first element unit and maintaining the OFF signal to the third element unit is performed, and after the second step-down control, third step-down control of maintaining the ON signal to the first element unit and outputting an ON signal to the third element unit is performed, and after the third step-down control, fourth step-down control of outputting an OFF signal to the first element unit and maintaining the ON signal to the third element unit is performed, and after the fourth step-down control, the first step-down control is performed, and the drive unit repeats control such that after first step-up control of outputting OFF signals to the second element unit and the fourth element unit, second step-up control of outputting an ON signal to the second element unit and maintaining the OFF signal to the fourth element unit is performed, and after the second step-up control, third step-up control of maintaining the ON signal to the second element unit and outputting an ON signal to the fourth element unit is performed, and after the third step-up control, fourth step-up control of outputting an OFF signal to the second element unit and maintaining the ON signal to the fourth element unit is performed, and after the fourth step-up control, the first step-up control is performed, and wherein the second step-down control is continued until the diode of the third element unit becomes conductive, and is switched to the third step-down control when the diode of the third element unit is conductive, during the third step-down control, the second element unit is kept non-conductive, and the third step-down control is switched to the fourth step-down control while the second element unit is kept non-conductive, and the fourth step-down control is performed so that the diode of the second element unit becomes conductive before a current flowing through the first element unit reaches 0, the second step-up control is continued until the diode of the fourth element unit becomes conductive, and is switched to the third step-up control when the diode of the fourth element unit is conductive, and during the third step-up control, the first element unit is kept non-conductive, and the third step-up control is switched to the fourth step-up control while the first element unit is kept non-conductive, and the fourth step-up control is performed so that the diode of the first element unit becomes conductive before a current flowing through the second element unit reaches 0.

2. The DC-DC converter according to claim 1, further comprising:

a second capacitor that has one electrode electrically connected to a connection node that connects the fourth element unit and the first inductor, and another electrode electrically connected to the reference conductive path, the second capacitor being arranged in parallel with the fourth element unit.

3. The DC-DC converter according to claim 2, wherein an inductance of the second inductor is smaller than an inductance of the first inductor.

4. The DC-DC converter according to claim 2, wherein a plurality of voltage conversion units are provided, each voltage conversion unit being provided with the first switching circuit, the second switching circuit, the first inductor, and the second inductor, and each voltage conversion unit is provided in parallel between the first conductive path and the second conductive path, and is electrically connected to the reference conductive path.

5. The DC-DC converter according to claim 1, wherein an inductance of the second inductor is smaller than an inductance of the first inductor.

6. The DC-DC converter according to claim 5, wherein a plurality of voltage conversion units are provided, each voltage conversion unit being provided with the first switching circuit, the second switching circuit, the first inductor, and the second inductor, and each voltage conversion unit is provided in parallel between the first conductive path and the second conductive path, and is electrically connected to the reference conductive path.

* * * * *